(12) United States Patent
Stoja et al.

(10) Patent No.: US 12,436,214 B2
(45) Date of Patent: Oct. 7, 2025

(54) FIELD MODIFICATION DEVICE

(71) Applicant: Fraunhofer-Gesellschaft zur Förderung der angewandten Forschung eingetragener Verein, Munich (DE)

(72) Inventors: Endri Stoja, Wachtberg (DE); Dennis Philipp, Bremen (DE); Simon Konstandin, Bremen (DE); Thomas Bertuch, Wachtberg (DE); Matthias Gunther, Bremen (DE); Jürgen Jenne, Bremen (DE); Robin Niklas Wilke, Bremen (DE); Diego Betancourt, Wachtberg (DE); Reinhold Umathum, Wachtberg (DE)

(73) Assignee: FRAUNHOFER-GESELLSCHAFT ZUR FORDERUNG DERANGEWANDTEN FORSCHUNG EINGETRAGENER VEREIN, Munich (DE)

( * ) Notice: Subject to any disclaimer, the term of this patent is extended or adjusted under 35 U.S.C. 154(b) by 57 days.

(21) Appl. No.: 18/106,595

(22) Filed: Feb. 7, 2023

(65) Prior Publication Data
US 2023/0280424 A1 Sep. 7, 2023

(51) Int. Cl.
*G01V 3/00* (2006.01)
*G01R 33/36* (2006.01)
*G01R 33/54* (2006.01)

(52) U.S. Cl.
CPC ....... *G01R 33/3621* (2013.01); *G01R 33/543* (2013.01)

(58) Field of Classification Search
CPC .......................... G01R 33/3621; G01R 33/543
(Continued)

(56) References Cited

U.S. PATENT DOCUMENTS 7,864,394 B1 * 1/2011 Rule ..................... G02F 1/0126
359/244
2013/0165768 A1  6/2013 Biber
(Continued)

FOREIGN PATENT DOCUMENTS

CN        1929198 A  *  3/2007  ............. H01Q 1/243
CN     101675353 A  *  3/2010  ........... G01R 33/288
(Continued)

OTHER PUBLICATIONS

KR 20150059512 A (Kim) (Year: 2015).*
(Continued)

*Primary Examiner* — Walter L Lindsay, Jr.
*Assistant Examiner* — Frederick Wenderoth
(74) *Attorney, Agent, or Firm* — Ellen M. Bierman; Lowe Graham Jones PLLC

(57) ABSTRACT

Methods, systems, and techniques for a field modification device for modifying a transmission field (Tx) and/or a receive field (Rx) used by an MR system are provided. The field modification device comprises a plurality of resonator elements being inducible by the transmission field and/or the receive field to resonate, thereby modifying the transmission field and/or the receive field, respectively, wherein a respective resonance frequency and/or resonance phase of a respective resonator element and/or of a respective group of resonator elements is individually controllable. The field modification device further comprises a device controller configured to individually control the respective resonance frequency and/or resonance phase of the respective resonator element and/or of the respective group of resonator elements.

19 Claims, 20 Drawing Sheets

(58) Field of Classification Search
USPC .......................................................... 324/322
See application file for complete search history.

(56) References Cited

U.S. PATENT DOCUMENTS

| | | | | |
|---|---|---|---|---|
| 2014/0049297 | A1* | 2/2014 | Nagai | ..................... H03K 17/04 |
| | | | | 327/109 |
| 2020/0408861 | A1 | 12/2020 | Park et al. | |
| 2021/0141039 | A1 | 5/2021 | Findeklee et al. | |

FOREIGN PATENT DOCUMENTS

| | | | | |
|---|---|---|---|---|
| CN | 102349192 A | * | 2/2012 | ........... H01Q 15/008 |
| CN | 1878498 B | * | 3/2013 | ............. A61B 5/055 |
| CN | 103257457 A | * | 8/2013 | ........... A61F 2/1624 |
| DE | 19640010 A1 | * | 4/1998 | ........... H04N 11/167 |
| EP | 3666334 A1 | * | 6/2020 | ............... A61B 5/70 |
| WO | WO-2018215973 A1 | * | 11/2018 | ............. H03H 11/12 |

OTHER PUBLICATIONS

KR 20200145664 A (Bien) (Year: 2020).*
RU 2468507 C1 (Viktorovich) (Year: 2012).*
Issa, et al., "A Reconfigurable Capacitive Impedance Surface for 1.5T Magnetic Resonance Imaging Applications", Loughborough Antennas & Propagation Conference, LAPC 2017, Nov. 13, 2017.
European Search Report issued in European Application No. 22155610.3 on Jul. 13, 2022.
Communication Pursuant to Article 94(3) EPC issued in European Application No. 22155610.3 on Feb. 17, 2025.

* cited by examiner

FIELD MODIFICATION DEVICE

CROSS-REFERENCE TO RELATED APPLICATIONS

This application claims priority to European Patent Application No. EP 22 155 610.3, titled "Field Modification Device," filed Feb. 8, 2022; which is incorporated herein by reference in its entirety.

TECHNICAL FIELD

The present disclosure relates to a field modification device and field modification method for modifying a transmission field and/or a receive field of a magnetic resonance (MR) system like an MR imaging (MRI) system. The present disclosure also relates to an MR system and MR method for examining an object by MR, wherein the MR system and the MR method are configured to be used together with the field modification device and the field modification method. The present disclosure further relates to a computer program for controlling the field modification device and a computer program for controlling the MR system. Moreover, the present disclosure relates to a coil system comprising a coil and the field modification device.

BACKGROUND

MRI is considered the most versatile and powerful imaging modality available for clinical use nowadays. For almost five decades, the technology was improved, extended, and continues to evolve, still not reaching the physical limits. Technical and physiological limitations are hampering the advancement and constrain physically feasible developments, making it increasingly challenging to innovate.

While in clinical applications static magnetic field strengths of 1.5 T and 3 T are most common, research scanners have been developed with field strengths of 7 T, 9.4 T and even higher to benefit from the increase in signal-to-noise ratio (SNR). However, working at higher field strengths becomes progressively difficult due to the direct proportionality to the Larmor frequency, which defines the nuclear resonance frequency of atoms, particularly of hydrogen atoms.

A key limiting factor is the specific absorption rate (SAR) of the deposited radio frequency (RF) power that increases almost quadratically with frequency, setting practical limitations due to tissue heating. Besides general challenges for working at strong magnetic fields, electromagnetic wave phenomena become more relevant due to the shorter wavelength of the RF field used to excite and receive the MRI signal. Huge efforts have to be taken to tackle issues arising from the fact that the RF wavelength is in the order of an imaged object's dimensions, eventually creating interference patterns. As a consequence, MRI is sensitive to motion artifacts, which should be circumvented. At higher field strengths, the longitudinal relaxation time T1 of tissue increases, leading to an intrinsic limitation on the achievable imaging speed for some applications.

A main technical and physiological obstacle in MRI is also the use of gradient magnetic fields for spatial localization of the signal, which substantially limits the technically possible imaging speed. Despite recent advances in fast imaging approaches such as parallel imaging and compressed sensing, image acquisition can be considered comparably slow.

DETAILED DESCRIPTION

Figure 1:
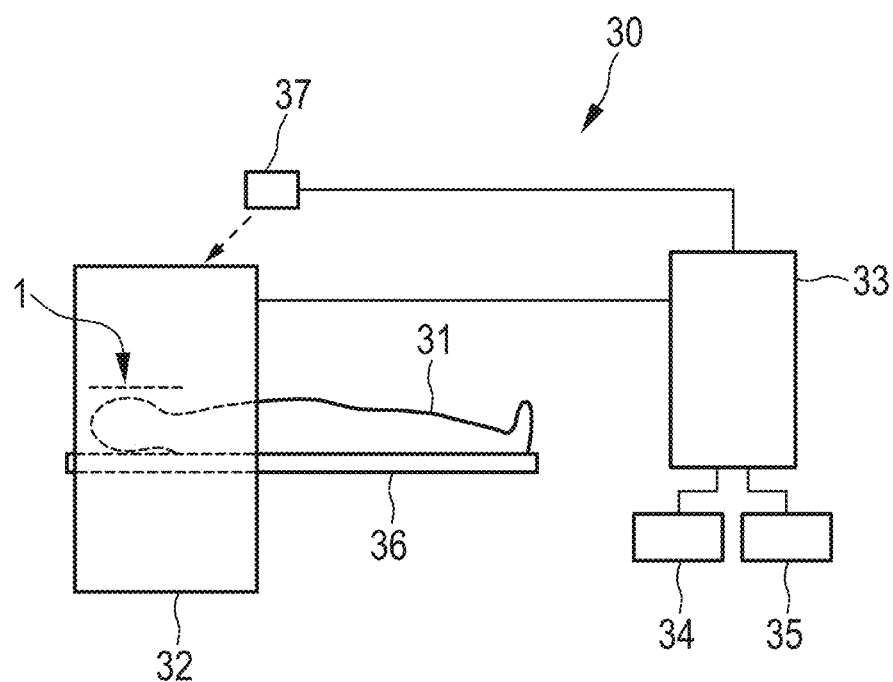
FIG. 1 shows schematically and exemplarily an embodiment of an MR system for examining an object by MR.

Despite recent advances in fast imaging approaches such as parallel imaging and compressed sensing, image acquisition can be considered comparably slow. To improve the imaging performance, patient-specific design of MRI equipment certainly is a possible approach but usually related to high costs, complicated design and manufacturing when it comes to, for instance, tailored receive coil arrays.

The best solution strategy to boost MRI and proceed to the next level of medical imaging performance should offer increased imaging efficiency, i.e. SNR, contrast and/or speed, without the immediate need of higher background field strengths.

The present disclosure describes a field modification device and method for modifying a transmission filed and/or a receive filed used by an MR system, which allow for an improved examination of an object by MR. Further, it describes an MR system and an MR method which allow for an improved examination of an object. As well, the present disclosure describes corresponding computer programs for controlling the field modification device and the MR system. The present disclosure also provides a coil system comprising a coil and the field modification device.

In a first aspect of the present disclosure a field modification device for modifying a transmission field and/or a receive field used by an MR system is presented, wherein the field modification device comprises
  a plurality of resonator elements being inducible by the transmission field and/or the receive field to resonate, thereby modifying the transmission field and/or the receive field, respectively, wherein a respective resonance frequency and/or resonance phase of a respective resonator element and/or of a respective group of resonator elements is individually controllable, and
  a device controller configured to individually control the respective resonance frequency and/or resonance phase of the respective resonator element and/or of the respective group of resonator elements.

Since the respective resonance frequency and/or resonance phase of the respective resonator element and/or of the respective group of resonator elements is individually controllable, the field modification device can be controlled such that, for instance, the SNR and/or scanning speed of an MR system can be increased.

The MR system preferentially is an MRI system. In particular, in an embodiment a significant SNR enhancement can be obtained in combination with an MRI scanner's body coil, MRI receive coils or MRI transmit coils. However, the field modification device can also be used with another MR system like a nuclear MR (NMR) spectroscopy system.

In one embodiment the field modification device, i.e. the resonator elements, is configured to be placed above a region of interest of the object that should be investigated. For instance, if a head of a patient should be imaged, the field modification device preferentially is placed above the head. However, the field modification device can also be placed at another position relative to the object like below the object.

The field modification device comprises the device controller configured to individually control the respective resonance frequency and/or resonance phase of the respective resonator element and/or of the respective group of resonator elements. In particular, the device controller is configured to dynamically control the respective resonance frequency and/or resonance phase of the respective resonator element and/or group of resonator elements. By controlling the respective resonance frequency and/or resonance phase of the respective resonator element and/or group of resonator elements, the resonance properties of the field modification device like the resonance frequency of the field modification device can be modified. It can also be modified which resonator elements contribute to the resonance of the field modification device and hence are active and which resonator elements do not contribute to the resonance of the field modification device and thus are not active. This control, which preferentially is a dynamic control, can be such that a desired modification of the incoming field and hence a desired result like an increased SNR is achieved. Dynamic control here means that the respective resonance frequency and/or resonance phase of the respective resonator element and/or a group of resonator elements changes over time. In an embodiment, the field modification device is dynamically controlled such that it is not required to use gradient magnetic fields or it is only required to use them to a reduced extent for imaging purposes. Moreover, normally, different MRI scanners have slightly different Larmor frequencies even though the static background field is said to be the same, e.g., 3 T. Since the field modification device is reconfigurable via the dynamic control, the field modification device can be adjusted for such Larmor frequency offsets easily, and it can be used with many different background field strengths such as 1.5 T, 3 T, 7 T et cetera. However, in another embodiment the control can also be a static control, wherein in this case the respective resonance frequency and/or resonance phase does not change over time.

In an embodiment the field modification device further comprises an energy harvesting element configured to harvest energy and to provide the harvested energy at least to the device controller. Moreover, the field modification device can be configured to provide the harvested energy to a respective controllable element of a respective resonator element like a respective controllable capacitor, a respective controllable inductivity and/or a respective controllable resistance.

It is preferred that the energy harvesting element comprises an energy reception element configured to receive energy from an energy source and an energy storage configured to store the received energy and to provide the stored energy. Preferentially, the energy storage is a rechargeable battery or a supercapacitor. Hence, the energy harvesting element can comprise, for instance, one or several supercapacitors and/or rechargeable batteries as energy storing element and one or several resonant circuits as energy reception element. The resonant circuit can be an antenna element. In particular, the energy harvesting element can comprise a battery and an antenna which is connected to the battery via a rectifier. The antenna can be, for instance, an outer loop. Varying current can be induced in the antenna, rectified and then used for loading the battery. This allows to transmit electrical energy to the field modification device in a reliable and relatively simple way.

In an embodiment, the outer loop, which might be used for receiving energy, can also be used for detuning the field modification device, i.e. for modifying the resonance frequency of the field modification device such that it differs from the frequency of the incoming field.

In an embodiment the field modification device comprises a signal receiver configured to receive a control signal that includes information on how the respective resonance frequency and/or resonance phase should be modified and to provide the control signal and/or the information to the device controller. The control signal can define which resonator elements should be controlled and/or when the respective resonance frequency and/or resonance phase should be modified and/or by which amount the respective resonance frequency and/or resonance phase should be modified. In particular, the resonance properties of the resonance elements can be dynamically controlled such that an optimization of the examination of the object is achieved in accordance with a respective intended use case. This will be explained in more detail further below.

The resonance behavior can be digitally controlled by using the device controller which might be a microcontroller or onboard logic. The device controller might act autonomously or might be controlled via, for instance, wireless connections to some other device by using Bluetooth Low Energy (BLE), WiFi, or another communication protocol. In particular, the field modification device can be controlled at any time such that its local resonance properties can be dynamically changed before or during, for instance, an MRI scan. Via the control of the resonance properties of the individual parts, i.e. of the resonator elements, of the field modification device, different time-modulated coding patterns can be obtained that interact with and thereby modify, for instance, the receive field which might be a receive field of an MRI system. The modified receive field, which might be regarded as being an MRI signal, can be received by a receiving device like an MR scanner's body coil or another dedicated coil. By a special image reconstruction procedure, the spatial signal distribution is obtained given the sequence of coding patterns used and signal transformations. Also this will be explained in more detail further below.

Usually, in MRI the spatial signal distribution is deduced from the use of gradient fields and a Fourier transformation. One gradient selects a slice to be excited and two other gradients give every voxel in that slice a different frequency or phase. Then, a Fourier transformation converts this into the actual image. To obtain the spatial signal distribution, therefore it is required to switch the gradient fields which consumes a lot of time and causes noise. Hence, it is preferred to reduce the switching of the gradient fields or to even not require any gradient field switching. This can be achieved by using the field modification device to shape the Rx field in a certain way by using the above mentioned coding patterns. The coding patterns define which respective resonator element is active at a given time instance and which respective resonator element is inactive at the given time instance. In an embodiment, the MR signal, i.e. the receive field, together with the respective coding pattern is recorded without the use of gradient fields. This is done for different coding patterns from a predefined set of coding patterns, wherein this predefined set of coding patterns can be regarded as forming a basis, wherein the full information about the spatial distribution of MR properties of the object can be recovered. To give an example, if an image of a two-dimensional slice should be generated, this slice can be subdivided into four quadrants, wherein four coding patterns can be present that are resembled with the field modification device and wherein each coding pattern enhances the signal coming from a respective quadrant, i.e. all individual resonator elements in one quadrant are active, all others are inactive. The MR signal is recorded with a receive (Rx) coil of an MRI system like a body coil and stored together with the corresponding coding pattern, i.e. together with the coding pattern that has been used while recording the MR signal. After four scans, it can be deduced, based on the four combinations of MR signal and coding pattern, how much MR signal comes from each quadrant and this information can be used for generating the actual image. Also smarter coding patterns are possible like Hadamard coding in two dimensions. The same applies but the reconstruction is then an inverse Hadamard transform of the MR signals recorded with the individual coding patterns. Also this will be explained in more detail further below.

The dynamic control of the field modification device can switch between the coding patterns faster than the gradients could be switched in the conventional sense. Thus, the more of the spatial encoding is transferred to the field modification device side, the less do the gradients need to do.

Thus, since image reconstruction is possible without using or with less using the gradient coils, the field modification device can allow for a reduction of switching times, i.e. it can allow for lower slew rates, of the gradient fields which are a severe limitation hampering the advancement of MRI and faster imaging due to physiological limitations. The imaging process can be speeded up and the noise can be reduced during imaging due to reduced gradient fields or even not required gradient fields. Furthermore, patient comfort can be enhanced due to faster and quiet scans. The manufacturing and operation can be simpler in comparison to only using gradient coils.

In one embodiment, only control signals and optionally also synchronization signals are transmitted to the field modification device, i.e. it is not required to transmit big volumes of data, wherein this transmission and hence control preferentially is a wireless transmission/control, but it can also be a wired transmission/control. The transmission of the control signals can be, for instance, an electromagnetic and/or optical transmission. Moreover, in an embodiment the field modification device receives the control signal by using receive (Tx) sequences of the MR system, i.e. the control signals can be included in the Tx sequences. This allows for a communication with the field modification device without necessarily requiring an extra pipeline or interface such as WiFi or Bluetooth.

In an embodiment an MRI scanner is located in a scanner room, wherein the field modification device is configured to be used within the MRI scanner. The field modification device can be configured to receive control signals from outside the scanner room by using the above described wireless communication. However, the field modification device also can be configured to receive the control signals from the MRI scanner within the scanner room.

In one embodiment the signal receiver is configured to receive a synchronization signal. In particular, the signal receiver can be configured to receive a control signal, which is transmitted to the field modification device, after the synchronization signal has been received. For instance, for synchronizing the field modification device with the scanner that preferentially is an MRI scanner, a trigger pulse can be transmitted to the field modification device from, for instance, the scanner or from another device used for synchronizing the field modification device and the scanner. In the latter case also the scanner receives the trigger pulse. The trigger pulse can be transmitted, for instance, optically and/or electrically. The trigger pulse "tells" the field modification device, for instance, that a control signal included in a Tx sequence will follow. Then, the scanner can use a Tx sequence for transmitting control information to the field modification device. In an embodiment, the trigger can be set at any time of a Tx sequence and not just before a Tx pulse. Using these, the field modification device can be synchronized at any time.

Thus, the Tx pulse or Tx sequence might be used, for instance, to change the chosen set of active individual resonator elements, i.e. to change the coding pattern, by changing resonance frequencies and/or resonance phases of the resonator elements, particularly each time after a trigger, i.e. after a synchronization signal has been received. The trigger can be detected by some circuit or device as conventionally done by other applications, which is configured to, for instance, detect optical and/or electrical signals, if the trigger pulse is transmitted optically and/or electrically, respectively. Thus, logic with receiver can be included in the field modification device such that a special custom-made Tx sequence can be used to transmit information.

Preferentially, the signal receiver includes an antenna element like a conducting loop which might be a wire loop or a conducting trace on a printed circuit board (PCB). The conducting loop comprises conducting material like conducting metal. For instance, the wire loop might be a copper loop or a loop comprising another conducting material. The conducting trace might be a copper trace or a trace comprising another conducting material. The antenna element can be used just for receiving information, for instance, via the Tx sequence, but it can also be used for further purposes like receiving energy for energy harvesting or for detuning the field modification device as it will be explained further below.

The control of the resonator elements of the field modification device such that a desired goal is achieved like an increased SNR can be in accordance with predefined control information which define, for instance, the resonance frequency and/or the resonance phase of individual resonator elements or of groups of resonator elements. This control information can be predefined by using optimization techniques. For example, a property like the SNR can be measured and the resonance frequencies and/or resonance phases of the resonator elements can be modified, until the measured property fulfills a desired goal, wherein this can be achieved by measuring a property like the SNR and modifying the resonance frequencies and/or resonance phases of the resonator elements, until a corresponding predefined target function is optimized. The SNR or another property might be measured in a predefined region surrounding the field modification device or within a volume enclosed by the field modification device. The optimization technique can try to optimize the property like the SNR, wherein the optimized property might be the average of the property in the predefined region. The optimization technique can be carried out in different steps, wherein in each step the resonance frequency and/or the resonance phase of one or several resonator elements is modified and wherein after each step it is determined whether the goal has been reached already or not. If the goal has been reached, the optimization process stops, otherwise it continues with the next modification step. For determining how to modify the resonance frequency and/or the resonance phase, known optimization techniques can be used like gradient descent based techniques.

The control of the resonator elements of the field modification device can also be such another desired goal is achieved like making the field modification device resonant at the frequency of the field to be modified. To achieve this, the individual resonator elements can be tuned in their respective resonance frequency to have the full structure, i.e. the entire field modification device, or a part of the field modification device resonant at the desired target frequency, i.e. at the frequency of the field to be modified. If this field is the receive field, also this could lead to an increased SNR close to the resonator elements of the field modification device.

Also, artificial intelligence (AI) based techniques can be used as optimization techniques. The AI can be trained to optimize a respective property. For instance, it can be trained to increase the SNR in one or several regions that can be influenced by the field modification device or to homogenize a signal in one or several regions or to create one or several signal-free regions to prevent high-energy absorption in these regions, for instance, in regions close to implants. For the training, data of an MR system, on-bench measured data from a laboratory and/or synthetic software simulation data might be used. Different AIs can be trained for optimizing different properties such that for each property a respective AI can be provided. The respective AI then can deliver a best configuration, which might be used already for controlling the field modification device, or the output of the trained AI might be used as a very good initial guess for further optimization algorithms like gradient descent-based algorithms.

The optimization can also include one or several boundary conditions, which might be weighted, in order to not only optimize the desired goal like an increased SNR, but to also consider further conditions like patient safety or unwanted effects which should be avoided.

Preferentially, the field modification device is configured to individually control the resonance frequencies and/or resonance phases of the respective resonator elements and/or of the groups of resonator elements such that the transmission field and/or the receive field is enhanced locally. This preferably is achieved by controlling the resonance frequencies and/or resonance phases of the resonator elements such that at least some of the resonator elements together are inducible to resonate at a frequency of the transmission field and/or of the receive field. In an embodiment the field modification device is configured to control the resonance frequencies and/or resonance phases of the resonator elements such that a group of the resonator elements together is inducible to resonate at a first frequency and another group of the resonator elements together is inducible at a second frequency which differs from the first frequency. In particular, in an embodiment the field modification device is configured to control the resonance frequencies and/or resonance phases of the resonator elements such that the first frequency is the frequency of the transmission field and/or the receive field such that the group of resonator elements resonates with the transmission field and/or receive field and the second frequency is not the frequency of the transmission field and/or the receive field such that the other group of resonator elements does not resonate with the transmission field and/or receive field.

Hence, in an embodiment, the field modification device can be configured and controlled such that some or all resonator elements, which might be regarded as being unit cells of a metamaterial, together are resonant at the frequency of the incident field, in order to pick up power from the incident field, to resonate and to thus emit electromagnetic radiation. The total power is, of course, not changed, but locally redistributed which leads to an SNR increase close to the field modification device.

Preferentially, a plurality of active resonator elements together meet the resonance condition while being excited by the incoming field, wherein this plurality of active resonator elements can be chosen via the dynamic control. This is because individual elements with the same or close resonances couple and give rise to an "averaged resonator", i.e., a full structure taking into account all active elements, of which the resonance is determined by the individual elements' resonances and the coupling, particularly the coupling mechanism and coupling strength. The coupling here is mainly inductive.

This resonating with the incoming field can lead to an increased SNR by locally focusing the incoming or incident field. For instance, the field modification device can be configured to increase the SNR by locally focusing an incident transmission field Tx, an incident receive field Rx or both, an incident transmission field Tx and an incident receive field Rx.

The control preferentially is a dynamic control, wherein the dynamic control can be used to decide which resonator elements shall be active at a given instance of time. This choice can depend on a region of interest (ROI) to be examined and/or an application in mind. Moreover, preferentially the control is not only configured to activate and deactivate resonator elements, but also to manipulate the resonance of individual elements because each different set of chosen active elements will, due to the geometry and coupling, lead to a different overall resonance which should be made to coincide with the frequency of the incident field. Thus, the dynamic control preferentially is able to decide for active elements and tune their respective resonances.

Preferentially, resonator elements are regarded as passive or deactivated if their resonance frequency is far below or above the excitation frequency, i.e., for instance, a scanner's Larmor frequency. Active elements couple and form an overall structure of which the resonance properties are controlled by the properties of all individual resonator elements and their coupling. The desired configuration, i.e. the set of active resonator elements, can depend on the application.

The field modification device itself preferentially is configured to only locally reshape or redistribute the incident field but preferentially does not yield a signal of which the information is extracted. This is to be done by receive Rx coils. For MRI, such receive coils are, e.g., the scanner's body coil, if present, or other "dedicated" Rx coils. Dedicated here means that usually these coils are dedicated to specific purposes, particularly to specific imaging purposes. They can be, for instance, surface coils, volume coils, array coils, et cetera. The scanner's body coil can be viewed as a universal coil which is most often also used to generate the transmit field Tx. However, there are also dedicated Tx coils for special purposes. In an embodiment, the field modification device therefore might be used in combination with either the body coil or any of the dedicated Rx or Tx coils.

In an embodiment the field modification device is configured to control the resonance frequencies and/or resonance phases of the resonator elements such that at least some of the resonator elements together resonate with their fundamental mode. Moreover, in an embodiment the field modification is configured to control the resonance frequencies and/or resonance phases of the resonator elements such that at least some of the resonator elements together resonate with a non-zero eigenmode, i.e. with a higher-order mode.

The full structure, i.e. the set of all active resonator elements, can be configured to resonate at the fundamental mode, i.e. at the lowest-order eigenmode or zeroth order, or at any higher-order eigenmode by tuning the resonances and phases of the resonator elements via the dynamic control. Thus, the field modification device can be configured to be a zeroth-order resonator, but it also can be configured to be a higher-order resonator. Zeroth-order resonator preferentially means that the lowest eigenfrequency is used to be matched with the frequency of the incident field, which might correspond to a scanner's Larmor frequency, wherein the scanner might be, for instance, an MRI or NMR scanner. The zeroth-order resonator is such that the resonance properties do not depend on the geometrical dimensions of the resonator itself.

The zeroth-order resonator preferentially means that the full structure is in phase and resonates at the so-called fundamental mode. Also higher-order modes are of interest, in which not the full structure is in phase but there is a phase profile. The field modification device can be configured and/or controlled such that different modes, in particular higher-order modes, of resonances of the field modification device are used, i.e. such that the frequency of a higher-order mode matches the frequency of the incident field. Higher-order modes can offer an increased field focusing at the cost of penetration depth.

Eigenmodes show a spatial profile. Hence, encoding spatial information can also be done with higher-order modes. Each higher-order mode has its particular phase profile, which leads to the effect that different higher-order modes enhance an MR signal in different spatial regions. Preferentially, it is known which higher-order mode enhances the MR signal in which region such that, if an MR signal is received by a receive coil, while the field modification device was controlled to be in a certain higher-order mode, it is known from which spatial region the received MR signal originates. In particular, a system controller of an MRI system can be configured to send control signals to a field modification device such that the field modification device is operated subsequently in different higher-order modes, in order to enhance the signal subsequently in different spatial regions, while MR signals are received by the receive coils of the MRI system. Since the system controller then knows which MRI signal originates from which spatial region, the system controller can reconstruct an MR image such that, for instance, a higher image element value, which might be a voxel value or a pixel value, is assigned to a spatial region, from which a higher intensity MR signal has been received, in comparison to another spatial region from which a lower intensity MR signal has been received. Hence, if the different higher-order eigenmodes are subsequently tuned to the Larmor frequency of the MRI system, i.e. one after the other, the MR signal change observed by using the receive coils allows to infer spatial image information which can be used by the system controller for reconstructing the MR image.

Preferentially, a respective resonator element comprises a respective controllable element which preferentially has a modifiable capacitance and/or a modifiable inductivity and/or a modifiable resistance, in order to allow for an individual control by modifying the capacitance and/or inductivity and/or resistance of the controllable element. For instance, a respective resonator element can comprise a diode, in particular a varactor diode, a PIN diode with node control and/or another diode, a capacitor, in particular a digitally tunable capacitor, transistor, inductance, resistance, et cetera. This allows to effectively and accurately control the resonance properties of the field modification device.

In an embodiment the resonator elements are controlled by manipulating their resonance frequency and/or resonance phase via the dynamic control. For instance, the field modification device can comprise a matrix arrangement of the resonator elements, wherein each of them can have a digital capacitor interfaced by a microcontroller of the field modification device, for example, on a same PCB. By controlling each digital capacitor individually, the resonance frequency and/or resonance phase of individual resonator elements can be changed. The microcontroller can be interfaced via a Bluetooth connection or via another data connection to a notebook or to another device, in order to define how the resonance frequency and/or resonance phase of a respective resonator element or a respective group of resonator elements should be changed.

In an embodiment the respective resonator element has a circular, polygon or elongated shape. The polygon shape preferentially is a rectangular shape. Moreover, in an embodiment the respective resonator element has an elongated shape, wherein the different elongated resonator elements are parallel to each other. In particular, a respective resonator element might comprise a respective elongated conducting element like an elongated wire or an elongated conducting trace on a PCB. The conducting element comprises a conducting material like copper or another metallic conducting material. Furthermore, in an embodiment the respective elongated conducting element might be connected in series to the respective controllable element.

For instance, in an embodiment the field modification device acts as a system of closely-coupled resonator elements, wherein each resonator element comprises a respective elongated conducting element being electrically elongated by series connected end capacitors. Such system can support hybrid electromagnetic modes with a specific spatial H-field profile. When a specific field profile of a certain mode is of interest, the mode can be tuned to resonate at a desired target frequency by control of the capacitor values, while a spatial modulation of such capacitances can introduce field profile modifications which can in turn be exploited to achieve a certain goal such as, for example, maximum field homogeneity over a region on interest at a certain distance from the field modification device. The mode profile is related to the relative strength of the currents on each elongated conducting element.

The elongated conducting elements with the series connected end capacitors can form the resonator elements, wherein these resonator elements, particularly the elongated conducting elements, can be parallel to each other. The resulting structure can resemble a finite-length artificial transmission line, wherein the propagation direction is the direction that is perpendicular to the elongated conducting elements and that is within the two-dimensional arrangement formed by the resonator elements. The direction might be defined as being a z direction. Preferentially, the elongated conducting elements act as inductors, wherein, by controlling the capacitances, dispersion characteristics of the artificial transmission line can be controlled, hence a standing waves resonant frequency for a given line length can be controlled. These standing waves can give rise to the desired field profiles.

In an embodiment a respective resonator element comprises a DC block and/or a coil. Moreover, in an embodiment neighboring resonator elements are electrically connected to each other. Furthermore, in an embodiment a respective switching element is electrically connected between neighboring resonator elements.

In an embodiment neighboring resonator elements are directly coupled via diodes which preferentially are PIN diodes. Preferentially, the diodes are connected to the respective resonator element between a respective coil of the respective resonator element and a respective DC block of the respective resonator element, if they are present. Furthermore, a voltage source can be provided, which allows to separately apply a respective voltage to an end of a respective coil of the respective resonator element, wherein these voltages might be regarded as being control voltages. By proper application of the control voltages and considering that the diodes act as binary switches, certain resonator elements, particularly outer resonator elements, can be disconnected, thus allowing for an electronic control of the length of the artificial transmission line. Given that the field focus size is related to the length of the structure, the focus itself can be electronically controlled in this case.

In an embodiment the plurality of resonator elements are arranged on a flexible support element. Preferentially, the flexible support element is a flexible foil or textile, thereby allowing the field modification device to be conformable to a living subject to be examined and better placeable on the subject by a user.

Moreover, in an embodiment the plurality of resonator elements are arranged periodically. Thus, the field modification device, which could also be regarded as being an electromagnetic metamaterial, is an artificially constructed structure preferentially comprising a periodic arrangement of resonator elements which can include dielectric or conducting elements. In an embodiment, the resonator elements, which might also be regarded as being unit cells, could be considered also as single metaatoms on a sub-wavelength scale. Therefore, an incident electromagnetic field is subject to a macroscopic influence induced by the interactions of all metaatoms. Hence, regarding RF field interaction the metamaterial, which—in case of a two-dimensional arrangement—might also be regarded as being a metasurface, can be viewed as a homogeneous material slab effectively described by permeability and permittivity, especially anisotropic and dispersive permeability and permittivity. In contrast to naturally occurring materials, a metamaterial can be designed to have arbitrary positive and negative values for both parameters. This can lead to, for instance, field enhancement, phase changes, and tailored reflection and transmission properties.

Preferentially, at least some, in particular all, of the resonator elements are identical. Moreover, the field modification device can comprise a one-dimensional, two-dimensional or three-dimensional arrangement of the resonator elements. In particular, the plurality of resonator elements can form a single two-dimensional arrangement or several two-dimensional arrangements. The single or several two-dimensional arrangements can be, for instance, arrangements in a respective plane, i.e. the two-dimensional arrangement can be planar. However, the two-dimensional arrangement also can be non-planar, particularly curved. For instance, the two-dimensional arrangement can be a surface of a sphere or of another curved object. If the plurality of resonator elements form a single two-dimensional arrangement, they can be regarded as forming a metasurface. The resulting layer of resonator elements preferentially has a sub-mm thickness. The field modification device in the realization of a thin metasurface can lead to a huge SNR enhancement in layers parallel and very close to this metasurface. Hence, it can be used ideally for NMR spectroscopy of thin layers for which this metasurface is simply placed above or below the layer of interest. The signal can be recorded as usual with the conventional Rx coil.

In an embodiment the plurality of resonator elements form several two-dimensional arrangements being parallel to each other. Thus, in an embodiment, the plurality of resonator elements can be regarded as being arranged in several parallel layers.

In an embodiment the resonator elements might be arranged matrix-like. Moreover, in an embodiment several matrix-like arrangements of resonator elements can be overlapped, i.e. arranged on top of each other.

In one embodiment, a first two-dimensional arrangement of resonator elements is combined with a second two-dimensional arrangement of resonator elements in an MRI scanner for SNR enhancement. For field enhancement on small local scales, the resonator elements should be small. However, the penetration depth is roughly limited by the dimension of these resonator elements thus leading to effects in small local regions around the resonator elements only. Hence, only slices very close to the resonator elements can be affected. An additional arrangement of resonator elements can boost the penetration depth and can allow for a joint system that has small resonator elements but a relatively large sensitive area.

In an embodiment, the field modification device comprises a loop surrounding the plurality of resonator elements. The ends of the loop preferentially are connected via a pair of diodes which are arranged such that they conduct in opposite directions. For instance, the field modification device can comprise elongated conducting elements with series connected end capacitors forming the resonator elements, wherein these resonator elements, particularly the elongated conducting elements, are parallel to each other. The resulting structure resembles, as explained above, a finite-length artificial transmission line, wherein the propagation direction is the z direction. A loop can surround the plurality of resonator elements, wherein the ends of the loop can be connected via a pair of parallel diodes which are arranged such that they conduct in opposite directions. Thus, in this example the field modification device comprises an artificial transmission line resonator coupled to an external loop loaded by a limiting-diode pair. This coupled system of resonators supports hybrid modes which can be of interest for imaging. The loop subsystem might also be used to sense an impinging power strength and hence detune the whole field modification device should it be too high. This allows for self-detuning during, for instance, a transmission (Tx) cycle.

In an embodiment the elongated resonator elements of different two-dimensional arrangements are not parallel to each other. For instance, the field modification device can comprise several of the resonator element arrangements described above, wherein the several arrangements can be arranged on top of each other and can be rotated relative to each other, i.e. the several resonator element arrangements can have artificial transmission lines in different directions. For example, a field modification device can comprise two arrangements of resonator elements on top of each other and rotated relative to each other by 90 degrees, i.e. the angle between the artificial transmission lines of the different arrangements of resonator elements can be 90 degrees. This allows for the focus spot size to be controlled not only in a single direction like the z direction, but also in another direction like the x direction.

In an embodiment the plurality of resonator elements are arranged such that they enclose a volume. In particular, the field modification device can comprises a structure enclosing the volume and holding the resonator elements. For instance, the structure can be a casing with an opening for allowing an object or a part of the object to be arranged within the casing, wherein the resonator elements are arranged on a wall of the casing. Thus, the plurality of resonator elements may completely or partly enclose a volume. For instance, they can be arranged on sides of a box enclosing the volume. In an embodiment, the plurality of resonator elements are arranged in a volume enclosing design in which two or more sides of a box are covered by the plurality of resonator elements, wherein the box comprises an opening to insert a body region to be scanned into the volume. In another embodiment, the plurality of resonator elements are arranged in spherical regular or irregular distribution with an opening to insert an object like a body region or another object to be scanned.

The enclosed volume preferentially includes an object to be imaged by MRI. With such an arrangement of the plurality of resonator elements enclosing the volume, a significant SNR enhancement in the volume can be obtained such that the SNR enhancement is almost homogeneous. This arrangement can be used, for instance, for imaging of the heart, the prostate, the head, joints and extremities in general, et cetera.

Preferentially, also the field modification device with the resonator elements enclosing a volume can be fully controlled at any time such that the resonance properties can be dynamically changed before or during an MRI scan. The MRI signal can be recorded by the MR scanner's body coil or another dedicated coil or coil arrangement. The enclosed volume of course also can be examined by using another MR technique like NMR.

A two-dimensional arrangement of resonator elements, which might be regarded as forming a two-dimensional metamaterial and hence, since being two-dimensional, a metasurface, can enhance the SNR in its vicinity, because it is a local effect. The effect drops off with the distance to the metasurface. Thus, having a second metasurface, which might be parallel to the first one, in the entire region the drop-off related to one of them is superimposed by the enhancement of the other. This can lead to a homogeneous effect, or almost homogenous effect, in the region in between. Preferentially, the full system, which could also be named "effective system", is tuned because two (parallel) metasurfaces couple and should be described by a 'full system'. The resonance of the full system differs from the individual resonances due to the coupling and also depends on their distance and relative arrangement. All this also applies if not only two metasurfaces are used but if individual elements are configured such that they enclose a volume of interest. The dynamic control preferentially takes care of tuning the full system to the resonance of the incident field by using all degrees of freedom, i.e. by controlling all individual elements in resonance and phase.

Preferentially, the field modification device is configured to surround as the volume an imaging region of an MRI scanner. For instance, the field modification device can be used instead of an RF shield of an MRI scanner. The field modification device can be cylindrical.

In an embodiment the field modification device is configured such that it does not modify the transmission field. In particular, the device controller can be configured to individually control the respective resonance frequency and/or resonance phase of the respective resonator element and/or of the respective group of resonator elements such that the resonance frequency of the field modification device differs from the frequency of the transmission field such that the transmission field is not modified. Thus, the field modification device can be configured to be detuning in a transmit phase, i.e. in a Tx phase, to protect the object, which preferentially is a patient, and also electronics. Since the field modification device can be synchronized with the MRI scanner via a trigger signal before a Tx pulse, particularly before each Tx pulse, the detuning can be carried out actively via the dynamic control. This means, for instance, to bring all individual resonator elements to a state of which the resonance is far away from the scanner's Larmor frequency. It then counts as detuned, i.e. "invisible".

In an embodiment, the field modification device comprises a battery-powered sensing circuit that senses a transmission field and informs the device controller accordingly, in order to allow the device controller to detune the field modification device, if the sensing circuit has sensed the transmission field.

In an embodiment, the field modification device can comprise a non-linear power sensing element for ensuring that the transmission field is unaltered. In particular, the resonator elements can be inductively coupled to one or more power-strength-sensing loops with non-linear elements like varactor diodes and passive limiter diodes, in order to provide a self-detuning of the field modification device while the transmission field is present. This can ensure that there is no or substantially no effect on a transmission pulse during, for instance, MRI, and, as indicated above, a patient and electronics can be protected in the transmission phase of MRI. This allows to provide dedicated receive field effects without transmission field manipulation.

In an embodiment, the detuning during Tx works by the use of non-linear elements like diodes, transistors or other non-linear elements included in the resonator elements, which change their behavior depending on the amount of incident power which is converted into a current flowing or a voltage between points. Only a single resonator element can have one or several non-linear elements, or several resonator elements each can have respective one or several non-linear elements. The behavior is such that, e.g., the conductivity, or the capacitance, or the inductance of the at least one resonator element of the field modification device changes in a way which causes the resonance frequency and/or phase of the entire field modification device to change. In Tx, there is a strong excitation pulse and the incident power is high. This can trigger the non-linear behavior. In Rx, the incident power is low because the MRI signal is weak as compared to the Tx pulse. Hence, during Rx the respective resonator element remains in a well-defined resonant state.

In an embodiment, the resonator elements are enclosed by an outer loop into which this non-linear element like a diode, transistor or another non-linear element is integrated. This loop is inductively coupled to the resonator elements. The combination of the outer loop and the resonator elements forms a non-linear field modification device. In this way, a single, non-linear element suffices to detune the full structure in Tx. However, it is of course possible, and for some application might be better, to use a non-linear component in one, some or all of the resonator elements, as described above.

The described scheme may be termed automatic detuning because no outer influence by, for instance, a user is needed. Another solution for Tx field detuning is to do it manually.

In an embodiment the field modification device comprises a conducting loop which surrounds at least a subgroup of the plurality of resonator elements. The conducting loop can comprise two ends which might be connected via a pair of parallel diodes which might be arranged such that they conduct in opposing directions, as explained above. The conducting loop might surround all resonator elements. Moreover, the conducting loop might be the antenna element of the signal receiver. Also, the conducting loop might be configured such that the resonance frequency of the field modification device differs from the frequency of the transmission field such that the transmission field is not modified, as explained above. Furthermore, in an embodiment the field modification device comprises several conducting loops, wherein a respective conducting loop surrounds a respective subgroup of the resonator elements. Preferentially, the conducting loop is a wire loop or a conducting trace on a PCB. The wire loop might be a copper loop or a loop comprising another conducting material. The conducting trace might be a copper trace or a trace comprising another conducting material.

The device controller and/or the received control signal can be configured to control the respective resonance frequency and/or resonance phase of the respective resonator element and/or group of resonator elements individually such that a transmission frequency of the transmission field and/or a receive frequency of the receive field are modified. Moreover, the field modification device can comprise a power source configured to actively drive the resonator elements. Modifying the frequency can allow for multinuclei imaging in MRI with existing hardware of 1H-resonance MRI scanners by frequency down- and up-conversion in transmission and receiving, respectively.

Generally, in MRI different nuclei are related to different resonance frequencies for which the MRI hardware has to be optimized. The field modification device can be controlled such that it provides a frequency down-conversion during transmission Tx to locally excite a ROI at a shifted frequency. For instance, the transmission frequency of a transmission field Tx of a 1H MRI scanner (for instance, 3 T*42,577 MHz/T in case of a 3 T MRI scanner) can be shifted to a transmission frequency for exciting 19F (for instance, 3 T*40,053 MHz/T in case of a 3 T MRI scanner) by using the field modification device, and the receive frequency of the resulting receive field can be shifted back, i.e. upconverted, to the 1H frequency, in order to allow the receiving device of the MRI scanner like a birdcage coil, a body coil, et cetera to detect the receive field. The frequency shift in this particular case would be about 6% of the scanner's operational frequency. This allows narrowband scanners to perform other than 1H nuclei imaging by the simple positioning of the field modification device close to, in particular over, the ROI. This yields a significant improvement for multi-nuclei imaging as none of the existing hardware of the MRI scanner designed for 1H imaging needs to be exchanged or upgraded necessarily by further components.

Presently, the majority of clinical scanners are designed to perform 1H imaging. Hence, their operation is narrowband and they cannot be employed to perform other nuclei imaging due to the different gyromagnetic ratio. To enable such existing machines to perform imaging with different excited nuclei, preferentially the field modulation device is temporally controlled, i.e. temporally subsequent patterns of parameters defining the resonance properties of the resonant elements are applied to the field modulation device.

The control of the resonator elements of the field modification device such that the desired frequency conversion is achieved can be in accordance with predefined control information which defines, for instance, the resonance frequency and/or the resonance phase of individual resonator elements or of groups of resonator elements over time. This control information can be predefined by using optimization techniques. For example, the frequency of the modified field can be measured and the resonance frequencies and/or resonance phases of the resonator elements can be modified, until the measured frequency is similar to the desired frequency. The frequency might be measured in a predefined region surrounding the field modification device or within a volume enclosed by the field modification device. The optimization technique can try to optimize the converted frequency, wherein the optimized frequency might be the average of the measured frequency of the modified field in the predefined region. The optimization technique can be carried out in different steps, wherein in each step the resonance frequency and/or the resonance phase of one or several resonator elements is modified and wherein after each step it is determined whether the desired frequency has been reached already or not. If the goal has been reached, the optimization process stops, otherwise it continues with the next modification step. For determining how to modify the resonance frequency and/or the resonance phase, known techniques can be used like gradient descent based techniques. Also AI based techniques can be used. For instance, an AI can be trained with a set of goal functions. Then, for a new goal the AI may deliver the best configuration or, at least, give a very good initial guess for optimization algorithms. In particular, an AI can be trained to optimize the states of all individual resonator elements until the frequency down/up conversion is most efficient. The target function for optimization can be the signal intensity, or SNR, in the domain of interest, which might be a local sub-domain of the region covered by the field modification device or the entire region covered by the field modification device.

In an embodiment, the frequency shifting can be achieved similarly to the one employed in a heterodyne RF system, namely by means of a mixer. A mixer has two inputs and one output, wherein in this embodiment the input is the impinging field, i.e. the field to be modified, which might have a frequency f1 and which is the transmission field or receive field, while the second input at a frequency f2 is a periodic control signal applied to modulate the behavior of the controllable element of the respective resonator element with this frequency f2. The controllable element can be, for instance, a digital capacitor. If the controllable element is controlled in this way such that, for instance, its capacitance and/or its inductivity and/or its resistance is varied with the frequency f2, the two frequencies f1 and f2 are mixed by the respective resonator element such that the output frequency is, for example, f1-f2.

In an embodiment, each resonator element comprises a respective split ring resonator or a respective spiral resonator loaded by a respective digital capacitor, wherein the capacitance of the digital capacitor can be controlled such that it varies with the frequency f2. In a further embodiment, each resonator element comprises a respective varactor diode that loads a respective split ring resonator or a respective spiral resonator, wherein the varactor diode is controlled by using a slowly-varying voltage signal resembling a saw-tooth signal, wherein an appropriate circuitry like an RF choke might be used to isolate the slowly-varying voltage signal from RF signals. The frequency of the slowly-varying voltage signal should be small in comparison to f1 and the output frequency of the mixer. In an embodiment, each resonator element might also comprise an active device for amplifying the mixed output signal, wherein for powering the amplifier, energy harvested on the field modification device might be used.

In an embodiment, the device controller and/or the received control signal is configured to control the respective resonance frequency and/or resonance phase of the respective resonator element individually such that simultaneously or separate multi-nuclei imaging can be carried out by an MRI scanner. The modification of the frequency of the transmission Tx and/or receive Rx fields also can be used for performing spectroscopy like NMR spectroscopy. In particular, an NMR spectrometer can have a narrowband RF front-end allowing for better performance with regard to noise. At the same time, by shifting the frequency due the use of the field modification device it can be probed for various compositions.

In an embodiment the field modification device comprises an electromagnetic band gap (EBG) structure forming the resonator elements. In particular, the EBG structure comprises patches on a substrate, wherein a respective resonator element comprises a group of patches electrically connected to each other by a controllable element which is controllable such that the resonance frequency and/or resonance phase of the respective resonator element is modifiable. The controllable element can have a controllable capacitance and/or a controllable inductance and/or a controllable resistance. For instance, a controllable diode can provide a controllable resistance, wherein also, for example, a controllable capacitor or another controllable element can be used. The field modification device preferentially is configured such that the respective controllable element is controllable by the device controller of the field modification device.

In another aspect of the present disclosure a coil system comprising a coil and a field modification device is presented. Thus, the field modification device can be combined with a coil. The combination and hence coupling can be an inductive coupling and/or a capacitive coupling, particularly without a wired connection between the coil and the field modification device. However, it is also possible that there is a wired connection between the coil and the field modification device. The coil may be a simple surface coil with a single coil channel. For instance, it can be a conventional MR coil like a conventional MR conducting loop, i.e. a coil with a pre-amplifier and a signal output as known to the person skilled in the art, combined with a field modification device. The conducting loop preferentially surrounds the field modification device. If the field modification device comprises a two-dimensional arrangement of resonator elements, the conducting loop might surround the two-dimensional arrangement of resonator elements and might be located within a plane which might be formed by the two-dimensional arrangement. The coil might be configured to allow to extract an MR signal and/or to drive the coil system. For instance, the coil might comprise a corresponding port. Since the field modification device can control a field with which the field modification device interacts, the properties of the full system can be changed, particularly dynamically, which results in a "universal" coil system, because it can mimic the function of complicated conventional transmission Tx and/or receive Rx coils. The combination with the coil can allow to introduce virtual coil channels. Preferentially, the conducting loop is a wire loop or a conducting trace on a PCB. The wire loop might be a copper loop or a loop comprising another conducting material. The conducting trace might be a copper trace or a trace comprising another conducting material.

Special, i.e. dedicated and hence local, coils for Tx and/or Rx are generally used to improve the result of a special imaging tasks, for instance, to image a particular body region. For this purpose, the coil design like the geometry, the number of channels, et cetera generally is adapted to the purpose. The coil's sensitivity profile is such that it picks up signal from the region of interest in the best possible way, limiting the noise coming from other regions. The field modification device can be used together with a scanner's body coil, if present, to obtain a similar result. The body coil can be thought of as a large Tx/Rx coil of which the sensitivity profile covers almost all the volume in the scanner. However, this comes at the cost of good SNR in a defined region. Here the field modification device helps to improve the local properties of the body coil by local enhancement of SNR, locally reshaped field distribution, et cetera. The field modification device can be modified, i.e. the distribution of resonance frequencies and/or resonance phases among the resonator elements can be reconfigured in space and time, to adapt to a particular need. Thus, a region of interest can be chosen, for instance, a certain body part to be imaged. The field modification device then can be placed to "cover" this body part and can be configured to optimize some goal function like SNR increase in this region. Since that works with almost any kind of region, the field modification device in combination with the body coil, which does the Tx and Rx, can be regarded as forming a universal coil for many different imaging purposes. If there is no body coil as, for instance, in current 7 T scanners also a local coil like an existing MR coil or a single channel, simple surface coil, i.e. a loop of wire with readout port for the data, can be combined with the field modification device. Everything written before with the body coil remains true here as well. In particular, the combination of the simple surface coil and the field modification device is to replace multi-channel coils by virtual channels, i.e., for instance, by configured sensitive regions of the field modification device.

In an embodiment a coil system comprises the field modification device and a simple, single-channel surface Rx/Tx coil. This device then can be used as a conventional coil that can be reconfigured by using the dynamically controllable field modification device. Hence, the spatial properties at any instance of time of the full device can be controlled. Thus, the full device can be given, e.g., various spatial sensitivity profiles that mimic coil channels, i.e. virtual channels can be provided.

Thus, the field modification device can be used in combination with an MRI scanner's body coil to construct a "universal" wireless coil, i.e. enable imaging of different body parts without the need of any special adapted coil, or the field modification device can be used in combination with dedicated Tx and/or Rx coils to build a new kind of "smart" and wirelessly-controlled, reconfigurable coils. Different control configurations of the field modification device lead to different spatial sensitivity profiles, i.e. to different spatial regions in which the MR signal is enhanced, wherein the data obtained, while the field modification device was in a certain control configuration, are data of a respective corresponding channel.

In a further aspect of the present disclosure, an MR system for examining an object by MR is presented, wherein the MR system comprises:

a magnetic field generating and receiving device configured to generate at least a transmission field to be transmitted to the object for examining the object by MR, there-by generating a receive field, and to receive the receive field from the object, a system controller configured to generate a control signal defining resonance frequencies and/or resonance phases of the resonator elements of a field modification device for modifying the transmission field and/or the receive field in accordance with one or several of the above described embodiments, in particular as defined in any of claims 1 to 14, a signal transmitting device configured to transmit the generated control signal to the field modification device.

In an embodiment, the MR system is an MRI system or scanner. Thus, the magnetic field generating and receiving device can be further configured to generate a main magnetic field B0 for providing an orientation of spins within the object. Moreover, it also can be configured to provide gradient magnetic fields for providing a spatial encoding of the spins, wherein the system controller can be configured to generate an image of the object based on the received receive field and the spatial encoding provided by the gradient magnetic fields.

Moreover, the magnetic field generating and receiving device can be a single device or it can be separate devices, wherein in the latter case preferentially a first device having one or several coils generates one or several magnetic fields and a second device also having one or several coils receives the receive field.

The magnetic field generating and receiving device and the signal transmitting device can be integrated such that the control signal is transmitted to the field modification device by using the transmission field generated by the magnet field generating and receiving device. Hence, coils of the magnetic field generating and receiving device can be used for transmitting the generated control signal to the field modification device such that the magnetic field generating and receiving device can also be regarded as being a signal transmitting device. However, the signal transmitting device also can be a device being separate from the magnetic field generating a receiving device.

In an embodiment a) the system controller is configured to generate different control signals such that they are indicative of different coding patterns that define which resonator elements are active and which resonator elements are inactive, wherein a respective resonator element is active if it resonates with the frequency of the transmission field and/or with the frequency of the receive field and a respective resonator element is inactive if it does not resonate with the frequency of the transmission field and/or with the frequency of the receive field, b) the control signal transmitting device is configured to transmit the different control signals to the field modification device, in order to allow the field modification device to temporally subsequently apply the different coding patterns indicated by the different control signals while the magnetic field generating and receiving device generates at least the transmission field to be transmitted to the object for examining the object by MR, thereby generating the receive field, and receives the receive field from the object, such that, while a respective coding pattern has been applied, a respective receive field has been received, and c) the system controller is configured to generate an image of the object based on the respective received receive fields and the respective coding patterns. In particular, the system controller is configured to determine, based on the respective coding pattern, from which spatial region the respective receive field originates and to generate the image based on this spatial information. Preferentially, the system controller is configured to generate the different control signals such that the different coding patterns include one or several coding patterns defining that only a single resonator element or only a group of neighboring resonator elements are active. In one embodiment the system controller is configured to generate the different control signals such that the different coding patterns are in accordance with a Hadamard coding. The system controller then could be configured to generate the image of the object by applying an inverse Hadamard transform to the received receive fields.

Thus, by using the coding patterns that are created by the reconfigurable field modification device, MR image reconstruction is possible without requiring gradient coils or by using gradient coils less. Imaging with these coding patterns and then having a special reconstruction that depends on the set of coding patterns used, instead of a conventional Fourier transformation, allows to reconstruct the spatial distribution of signals, i.e. the actual MR image.

The field modification device therefore can reduce or even eliminate the utilization of the gradient magnetic fields used for spatial encoding in MRI by modulation of time-varying, i.e. dynamic, coding patterns constructed via a spatio-temporal reconfiguration of a single or a group of metamaterial unit cells, i.e. resonator elements, and their interaction with the incident magnetic field in combination with dedicated reconstruction algorithms. It allows to speed-up the imaging process significantly by the reduction of gradient fields, which generally put limits on technically possible imaging speeds due to physio-logical restrictions on gradient switching speeds. This can be achieved without necessarily requiring to modify the hardware of an MRI scanner. Thus, for instance, the software of an existing MRI scanner can be modified and the field modification device then can be used for reducing the utilization of gradient fields.

The field modification device also allows for noise reduction. As explained above, the noise reduction can be obtained, because less switching of gradients is required or even no switching of these gradients at all is required. One other mechanism of noise reduction is related to the smaller field of view obtained due to the focusing ability of the field modification device. Hence, less sample noise is collected due to the resulting limited spatial sensitivity profile of the resonator, i.e. of the resonating field modification device.

In an embodiment the field modification device is controlled such that higher-order imaging is carried out. If the above described the finite-length artificial transmission line view of the field modification device is used. The finite length transmission line supports different standing wave modes with different field profiles, which correspond to different voltage/current distributions along the artificial line, at different frequencies. By controlling the dispersion of the transmission line via, for instance, variable capacitances of the resonator elements, these different standing waves can be made to resonate at a target frequency each at a time. Hence, sample data can be acquired with different sensitivity patterns. Registering the weights of each sensitivity pattern corresponds to a modal expansion of the sample data. Knowing in advance the sensitivity patterns, allows for image reconstruction by proper weighting. In particular, the different sensitivity patterns define different spatial regions from which the respective MR signal, which is measured by using the receive coils and hence the receive field, originates, wherein the different spatial regions and hence the corresponding sensitivity patterns or eigenmodes can be regarded as being basis functions or basis images or basis sensitivity profiles defining a coordinate system and wherein the coordinates, which could also be regarded as being weights of the basis functions, are the measured MR signals, in particular, the measured MR signal intensities, while the respective eigenmode was active. The measured values therefore can be regarded as being a decomposition of the image to be reconstructed such that the image can be reconstructed by inversely transforming the measured values. This inverse transformation, which inverts the decomposition of the image to be reconstructed into the eigenmodes, can be, for instance, an inverse Fourier transformation.

The higher order resonances can be shifted to a scanner's resonance frequency, i.e. to the target frequency, wherein in this case it might not be implemented by time-modulation of square-law devices, but just by varying the capacitance values in a "static" fashion, which means that during the excitation and signal collection intervals the control signals do not vary in time. Thus, the capacitance values are dynamically varied, i.e. dynamically controlled, wherein this dynamic control changes the capacitance values between two excitation and signal collection intervals, whereas during the respective excitation and signal collection interval the capacitance values are not varied. Since also in this case the control is dynamic and not static, in is paragraph the word "static" has been set in quotation marks.

In an embodiment the signal transmitting device is configured to transmit a synchronization signal to the field modification device. In particular, the control signal transmitting device can be configured to transmit the control signal to the field modification device, after the synchronization signal has been sent to the field modification device.

Moreover, in an embodiment the system controller is configured to modify the control signal depending on the received receive field Rx. In particular, the system controller can be configured to generate an image of the object based on the received receive field Rx and to modify the control signal depending on the generated image. For instance, the system controller can be configured to determine a property value being indicative of a property to be optimized based on the received receive field and to modify the control signal such that the property is optimized. In an embodiment the MR system is configured to carry out following steps: a) generating the control signal defining resonance frequencies and/or resonance phases of the resonator elements of the field modification device and transmitting the generated control signal to the field modification device, b) transmitting the transmission field to the object for examining the object by MR, thereby generating the receive field, and receiving the receive field from the object, while the field modification device is controlled in accordance with the transmitted control signal, c) determining the property value of the property to be optimized based on the received receive field, d) modifying the control signal, e) transmitting the modified control signal to the field modification device, f) transmitting the transmission field to the object for examining the object by MR, thereby generating the receive field, and receiving the receive field from the object, while the field modification device is controlled in accordance with the transmitted modified control signal, g) determining a property value of the property to be optimized based on the received receive field, h) modifying the control signal such that the property is optimized based on the property value determined in step g) and the previously determined property value, i) repeating steps e) to h), until an abort criterion is fulfilled. It is preferred that the system controller is configured to generate an image of the object based on the received receive field and to determine the property value based on the generated image. Moreover, in one embodiment, the property is indicative of an SNR of the generated image.

Thus, a feedback-loop can be provided, wherein, for instance, results of MRI scanning are used for optimizing the control of the field modification device. In particular, the reconstructed MR image, or any intermediate data obtained from an MRI scanner, can be used to feed back the optimization of a specific target function, for instance, as explained above. If, for instance, the target function is maximum SNR in a defined region, the evaluation of SNR in that region can be carried out based on the MR image to be reconstructed first. The field modification device then can be controlled such that the evaluated SNR is increased. Hence, the value of the target function for optimization is determined from the MR image, or other recorded data such as raw data of the Rx coil.

Moreover, in an embodiment the field modification device is configured to shim the transmission field. Generally, the field modification device redistributes, i.e. shapes, the incident field, wherein, in case that this is the Tx field, the Tx field can be shaped. This is exactly what conventional shimming does: via superimposed magnetic fields generated by extra coils needed in the scanner, the homogeneity or another property in a given region of interest in the body or probe is improved. This can be done by reconfiguring the field modification device locally, i.e. by changing the resonance frequency and/or resonance phase of the resonator elements of the field modification device. The advantage is that no extra coils are needed. Hence, the field modification device is a multi-purpose device in principle. During Tx, it can shape the field, thereby replace or supplement conventional shimming, and during Rx it can be configured to improve SNR in a given region or optimize any other goal function. Preferentially, for this a feedback loop is used as mentioned above. It allows to optimize the configuration, i.e. the control of the resonance frequency and/or resonance phase of the resonator elements, depending on some outcome in the reconstructed MR image or any data analysis step from coil raw date to the image. The information can be used again to optimize the configuration by some algorithm or AI.

In an embodiment the system controller is configured to control the magnet field generating and receiving device such that it generates a magnetic field which allows an energy harvesting element on the field modification device to harvest energy. In particular, the system controller can be configured to provide a special "charging" transmission Tx sequence, which allows the energy harvesting element on the field modification device to harvest energy. To optimally charge the energy harvesting element, which might be regarded as being an energy harvesting circuit, a dedicated Tx sequence is best suited since imaging sequences used normally might lead to insufficient charging. Hence, a sequence which is not intended for imaging might be used for charging the component before the actual imaging sequence starts or a hybrid-sequence which does both will be used.

In another aspect of the present disclosure, a field modification method for modifying a transmission field and/or a receive field used by an MR system is presented, wherein a plurality of resonator elements of a field modification device are induced to resonate by the transmission field and/or the receive field, thereby modifying the transmission field and/or the receive field, wherein a respective resonance frequency and/or resonance phase of a respective resonator element and/or of a respective group of resonator elements is individually controlled, wherein a device controller individually controls the respective resonance frequency and/or resonance phase of the respective resonator element and/or of the respective group of resonator elements.

In a further aspect of the present disclosure, an MR method for examining an object by MR is presented, wherein the MR method comprises:
generating at least a transmission field to be transmitted to the object for examining the object by MR, thereby generating a receive field, and receiving the receive field from the object by a magnet field generating and receiving device,
generating a control signal defining resonance frequencies and/or resonance phases of the resonator elements of a field modification device for modifying the transmission field and/or the receive field in accordance with one or several of the above described embodiments by a system controller,
transmitting the generated control signal to the field modification device by a control signal transmitting device.

In a further aspect of the present disclosure, a computer program for controlling a field modification device as defined by any of the above described embodiments is presented, wherein the computer program comprises program code means for causing the field modification device to carry out the field modification method, when the computer program is run on a controller of the field modification device.

In a further aspect of the present disclosure, a computer program for controlling an MR system as defined by any of the above described embodiments is presented, wherein the computer program comprises program code means for causing the MR system to carry out the MR method, when the computer program is run on a controller of the MR system.

It shall be understood that the field modification device, the coil system, the MR system, the field modification method, the MR method, the computer program for controlling a field modification device and the computer program for controlling an MR system, can have similar and/or identical embodiments.

It shall be understood that an embodiment of the present disclosure can also be any combination of the dependent claims or above embodiments with the respective independent claim.

These and other aspects of the present disclosure will be apparent from and elucidated with reference to the embodiments described hereinafter.

FIG. 1 shows schematically and exemplarily an embodiment of an MR system for examining an object by MR. The MR system 30 comprises a magnetic field generating and receiving device 32 configured to generate at least a transmission field to be transmitted to an object 31 for examining the object 31 by MR, thereby generating a receive field, and to receive the receive field from the object 31. In this embodiment the MR system 30 is an MRI system and the object 31 is a patient lying on a support means 36 like a patient table. The MRI system 30 further comprises a system controller 33 configured to generate a control signal defining resonance frequencies and/or resonance phases of resonator elements of a field modification device 1, wherein the field modification device 1 is configured to modify the transmission field and/or the receive field. The MRI system 30 also comprises a signal transmitting device 37 configured to transmit the generated control signal to the field modification device 1.

The magnetic field generating and receiving device 32 is further configured to generate a main magnetic field B0 for providing an orientation of spins within the object 31. Thus, the magnetic field generating and receiving unit 32 preferentially comprises one or several coils for generating the main magnetic field BC. The magnetic field generating and receiving device 32 further comprises gradient coils for generating gradient magnetic fields for providing a spatial encoding of the spins, wherein the system controller 33 can be configured to generate an image of the object 31 based on the received receive field and the spatial encoding provided by the gradient magnetic fields. However, as it will be explained further below, the MRI system is also configured to use the field modification device 1 for generating an image of the object 31, wherein in this case the gradient magnetic fields are used less, in particular not used at all. Using the gradient magnetic fields less can allow for an increased SNR of the generated image.

The MRI system 30 further comprises an input device 34 like a keyboard, a computer mouse, a touchpad et cetera for allowing a user to provide an input into the MRI system 30 and an output device 35 like a display or monitor for showing a reconstructed image.

The control signal transmitting device 37 can be a separate device, i.e. a device being separate from the magnetic field generating and receiving device 32, but it can also be integrated in the magnetic field generating and receiving device 32, wherein in the latter case a separate control signal transmitting device might be omitted. In particular, the transmission field generated by the magnetic field generating and receiving device 32 can be used for transmitting the control signal to the field modification device 1.

Figure 2:
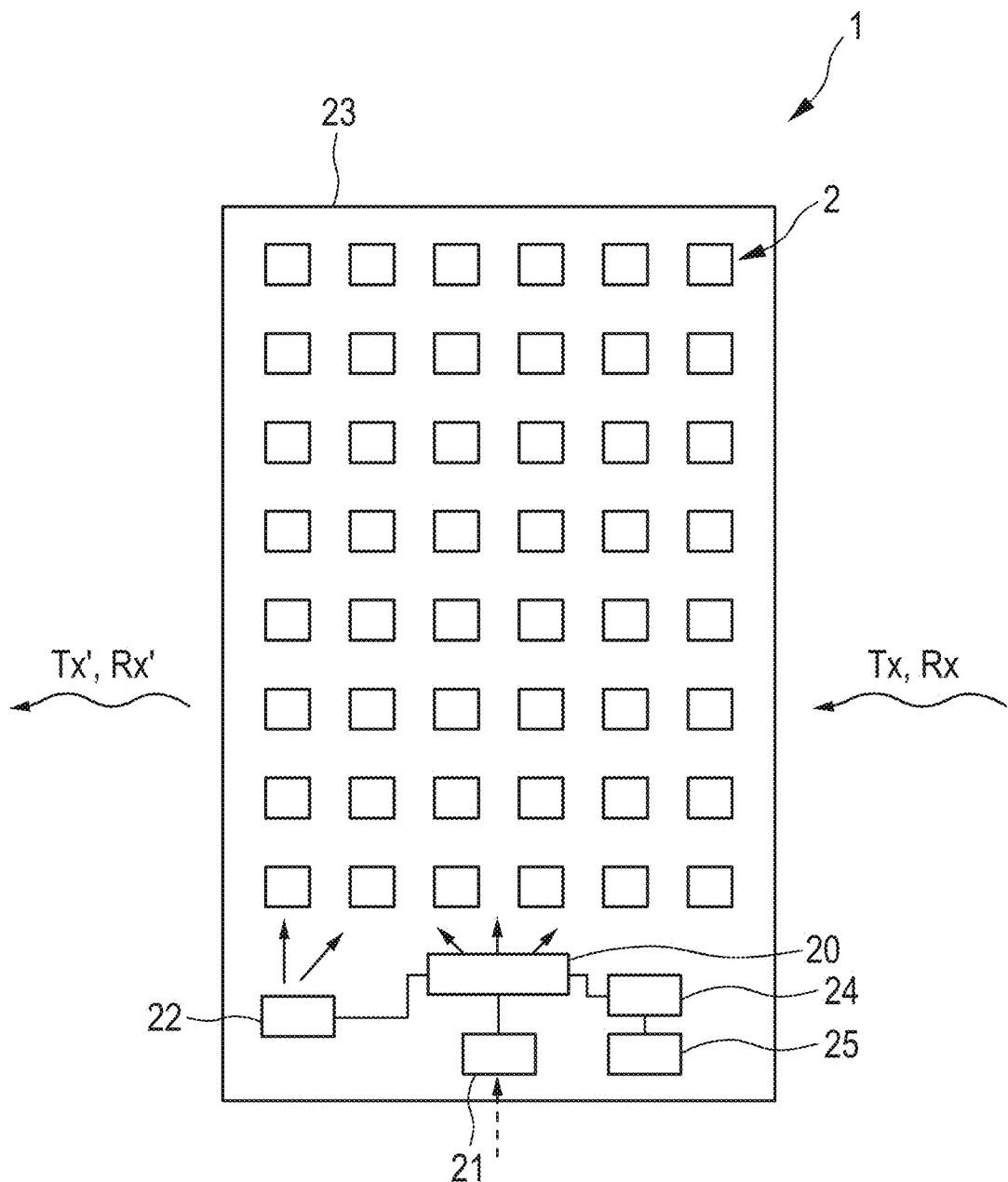
FIG. 2 shows schematically and exemplarily an embodiment of a field modification device for modifying a transmission field and/or a receive field used by the MRI system.

FIG. 2 shows schematically and exemplarily an embodiment of the field modification device 1. The field modification device 1 comprises a plurality of resonator elements 2 being inducible to resonate by the transmission field Tx and/or the receive field Rx, thereby modifying the transmission field Tx and/or the receive field Rx, respectively, wherein a respective resonance frequency and/or resonance phase of a respective resonator element 2 and/or of a respective group of resonator elements 2 is individually controllable. The individual control of the respective resonance frequency and/or resonance phase of the respective resonator element 2 and/or of the respective group of resonator elements 2 such that the transmission field Tx and/or the receive field Rx is modified can allow for many positive effects like an increased SNR or an increased scanning speed as has been explained above and as it will also be explained below. In FIG. 2 the modified transmission field and/or the modified receive field are indicated by Tx' and Rx', respectively.

In this embodiment the field modification device 1 with the resonator elements 2 is placed above a ROI of the patient 31, which should be imaged. In particular, in this example the head of the patient 31 should be imaged such that the field modification device 1 is placed above the head. However, the field modification device 1 could also be placed at another position relative to the ROI to be imaged like below the ROI.

The field modification device 1 comprises a device controller 20 configured to individually control the respective resonance frequency and/or resonance phase of the respective resonator element 2 and/or of the respective group of resonator elements 2. In this embodiment the device controller 20 is configured to dynamically control the respective resonance frequency and/or resonance phase of the respective resonator element 2 and/or group of resonator elements 2. For instance, the device controller 20 can dynamically control the resonance frequencies and/or resonance phases such that, as mentioned above, it is not required to use gradient magnetic fields or such that it is only required to use them to a reduced extend.

The field modification device 1 further comprises a signal receiver 21 configured to receive a control signal that includes information how the respective resonance frequency and/or resonance phase should be modified and that has been transmitted by the signal transmitting device 37 or by the magnetic field generating and receiving device 32 of the MRI system 30. The signal receiver 21 is further configured to provide the control signal to the device controller 20. The signal receiver 21 can also be configured to extract the information from the received control signal and to provide the extracted information to the device controller 20.

The control signal defines which resonator elements should be controlled and when the respective resonance frequency and/or resonance phase should be modified by which amount. This information provided by the control signal can be defined such that the imaging of the head of the patient 31 can be optimized by, for instance, increasing the SNR or increasing the scanning speed, as mentioned above.

Thus, the device controller 20, which might be a microcontroller or on-board logic, allows to digitally control the resonance behavior of the field modification device 1. The control device 20 can receive the control signals via a wireless data connection to the signal transmitting device 37 by using, for instance, Bluetooth, in particular Bluetooth Low Energy (BLE), WiFi or another communication protocol. As explained above, the wireless data connection can also be provided by using the transmission field of the magnet field generating and receiving device 32. In another embodiment, the device controller 20 can also be configured to act autonomously, i.e. without requiring received control signals.

The field modification device 1 can be controlled at any time such that its local resonance properties can be dynamically changed before or during an MRI scan. Via the control of the resonance properties of the resonator elements 2 of the field modification device 1, different time-modulated coding patterns can be obtained that interact with and thereby modify, for instance, the receive field Rx which is received by the MRI system 30. Based on the modified receive field Rx' and the used sequence of coding patterns, the system controller 33 can reconstruct an image of the head of the patient 31 as it will be explained further below.

The MRI scanner 30 can be located in a scanner room, wherein the field modification device 1 can be configured to be controllable from outside the scanner room by using the wireless communication between a) the field modification device 1 and b) the separate signal transmitter 37 or the signal transmission integrated in the magnetic field generating and receiving device 32. Thus, a user might initiate a desired imaging procedure from outside the scanner room, wherein then a corresponding control signal will be sent from the separate signal transmitting device 37 or from the magnetic field generating and receiving device 32 to the field modification device 1.

The plurality of resonator elements 2 are arranged on a flexible support element 23. The flexible support element 23 can be a flexible foil, a textile or another flexible support element. In another embodiment, the support element 23 can also a non-flexible structure.

In this embodiment the resonator elements 2 are identical and periodically arranged on the support element 23, i.e. they form a periodic matrix-like arrangement of resonator elements. Moreover, in this embodiment the resonator elements 2 form a two-dimensional arrangement in a plane located above the head of the patient 31. In another embodiment the resonator elements can also form a one-dimensional or a three-dimensional arrangement. Moreover, several two-dimensional arrangements can be present.

The field modification device 1 comprises a single two-dimensional arrangement of resonator elements 2, wherein the entire field modification device 1, or at least the arrangement of resonator elements 2 including the support element 23, preferentially has a thickness being smaller than 1 mm. It can therefore be regarded as being a thin metasurface which can lead to a significant SNR enhancement in layers parallel and close to this metasurface, i.e. close to the field modification device 1, even if standard MRI imaging is used.

The field modification device 1, in particular, the control device 20 of the field modification device 1, is configured to control the resonance frequencies and/or resonance phases of the resonator elements 2 such that a group of the resonator elements together is inducible to resonate at a first frequency and another group of the resonator elements is inducible at one or several second frequencies which differ from the first frequency. In particular, the first frequency is a frequency of the transmission field and/or the receive field such that the group of resonator elements 2 resonates with the transmission field and/or receive field and the second frequencies are not the frequency of the transmission field and/or the receive field such that the other group of resonator elements 2 does not resonate with the transmission field and/or receive field. The resonator elements 2 having a resonance frequency similar or close to the excitation frequency, i.e. the frequency of the transmission field and/or receive field, respectively, can be regarded as being active resonator elements, wherein resonator elements or a group of resonator elements having a resonance frequency far below or above this excitation frequency can be regarded as being passive or inactivate resonator elements or groups of resonator elements. The arrangement or distribution of active resonator elements and passive resonator elements can be regarded as being a coding pattern. In other words, in an embodiment a coding pattern defines which resonator elements are active and which resonator elements are not active. Active elements couple and form an overall structure of which the resonance properties are controllable by the properties of all active individual resonator elements and their coupling. Thus, an active resonator element is a resonator element which interacts with the incident field and its neighboring resonator elements above a measurement accuracy threshold or another given evaluation accuracy. In particular, if a respective resonator element contributes together with other resonator elements to a measurable modification of the field which should be modified by the field modification device, the respective resonator element is regarded as being active. Otherwise, it is regarded as being inactive. In other words, all resonator elements contributing to the modification of the field to be modified are regarded as being active resonator elements. For instance, in the case of MR imaging, if an effect of a resonator element cannot be seen in a final MR image, this resonator element is regarded as being inactive, whereas otherwise it is regarded as being active. In particular, all resonator elements, which contribute to a resonance of the field modification device with the transmission field and/or receive field, are regarded as being active resonator elements, wherein the resonator elements, which do not contribute to this resonance, are regarded as being inactive resonator elements. It is noted that generally the individual active resonator elements do not resonate at the transmission field and/or receive field frequency, but they contribute to the resonance of the field modification device at the transmission and/or receive field frequency.

In an embodiment the system controller 33 is configured to generate different control signals such that there are indicative of different coding patterns that define which resonator elements 2 are active and which resonator elements 2 are inactive. Moreover, the control signal transmitting device 32, 37 can be configured to transmit the different control signals to the field modification device 1, in order to allow the field modification device 1 to temporally subsequently apply the different coding patterns indicated by the different control signals while the magnetic field generating and receiving device 32 generates at least the transmission field to be transmitted to the head of the patient 31 for examining the head of the patient 31 by MR, thereby generating the receive field, and receives the receive field from the head of the patient 31, such that, while a respective coding pattern has been applied, a respective receive field has been received. The system controller 33 then can be further configured to generate an image of the head of the patient based on the respective receive fields and the respective coding patterns. In particular, the system controller 33 can be configured to determine, based on the respective coding pattern, from which spatial region the respective receive field originates and to generate the image based on this spatial information. For instance, the system controller 33 can be configured to generate the different control signals such that the different coding patterns include one or several coding patterns defining that only a single resonator element or only a group of neighboring resonator elements are active. The system controller 33 then can directly deduce that the respective receive field originates from a location close to the only active resonator element or the only group of neighboring active resonator elements.

Figure 3A:
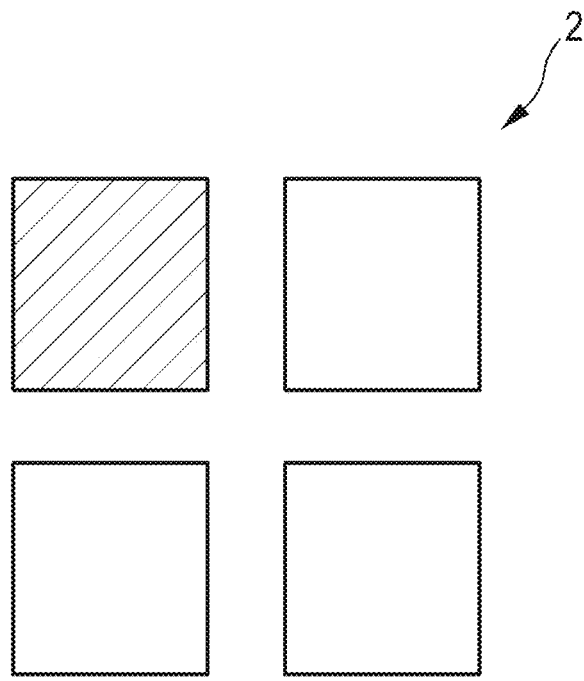
FIGS. 3A-3D illustrate coding patterns defining active and inactive resonator elements of the field modification device.
Figure 3B:
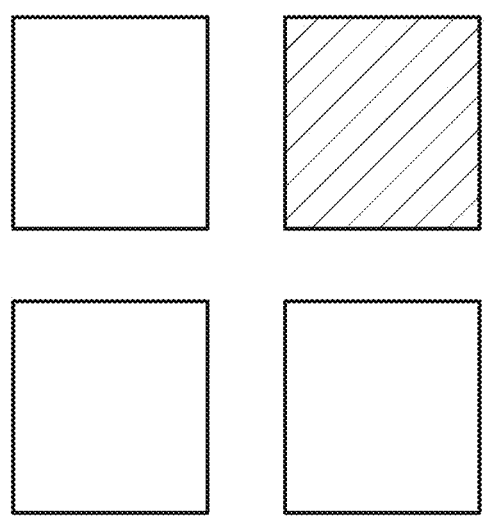
Figure 3C:
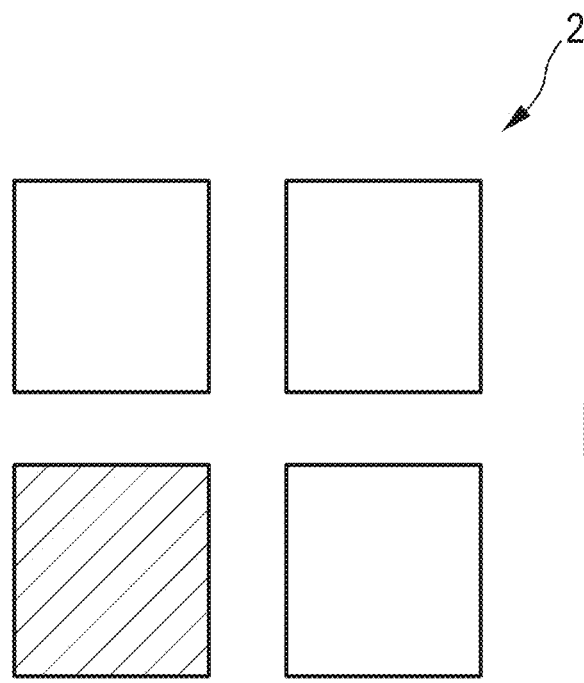
Figure 3D:
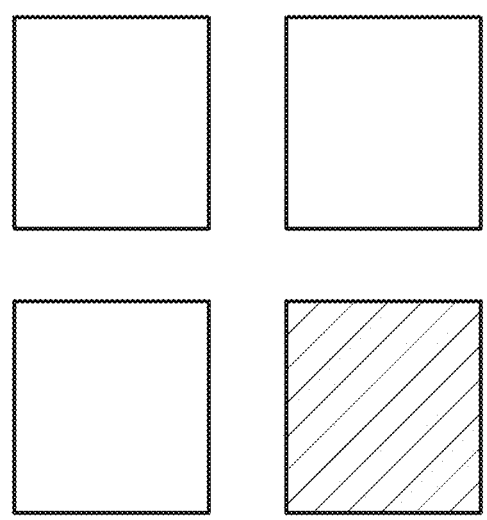

Thus, the field modification device 1 can be used to shape the receive field in a certain way by using coding patterns, wherein the coding patterns "tell" which respective resonator elements 2 or groups of resonator elements 2 are active at a given time instance. The receive signal, i.e. the receive field or MR signal, then can be received and recorded without the use of gradient fields, wherein this is done for different coding patterns preferentially from a set of given coding patterns. To give a simplified example, FIGS. 3A to 3D show a group of four resonator elements 2, wherein in each of these figures another resonator element of the resonator elements 2 is active, i.e. in the respective figure the hatched resonator element 2 indicates the respective active resonator element. Thus, FIGS. 3A-3D show different coding patterns. The received receive signal, which has been obtained while the coding pattern was present, which is shown in FIG. 3A, indicates the MR properties of the object to be imaged close to the corresponding active resonator element. Thus, the system controller 33 knows that the received MR signal, i.e. the received receive field Rx, originates from a spatial location close to the active resonator element. In the same way, the system controller 33 knows, when the coding patterns shown in FIGS. 3B to 3D are used, that the respective MR signal originates from a spatial location within the object being close to the respective active resonator element. In other words, the system controller 33 can easily determine from which spatial location how much MR signal comes, wherein the more MR signal comes from a certain spatial location, the higher can be the image value of the respective pixel or voxel in the image to be reconstructed.

The reconstruction can be carried out by applying an inverse transformation to a matrix in which the measured values, i.e. the MR signals, particularly the intensity of the MR signals, are arranged. In the following this will be illustrated with reference to FIG. 4.

Figure 4:
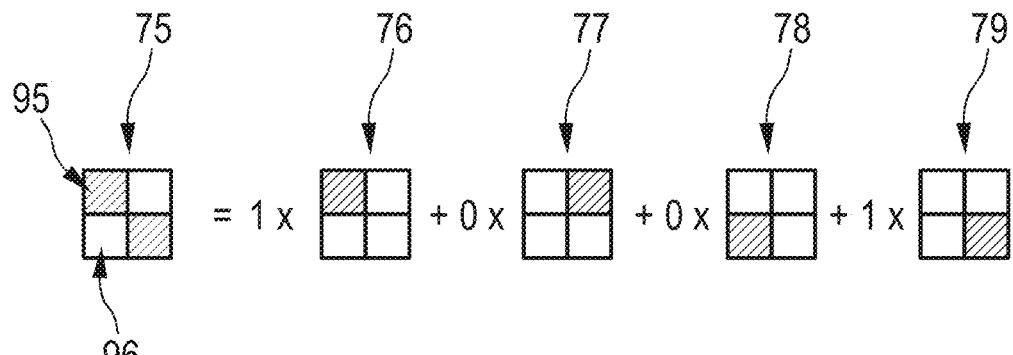
FIG. 4 illustrates schematically and exemplarily a decomposition of an image into single-pixel basis images.

In FIG. 4, it is assumed that a spatial image 75 should be reconstructed, wherein in this illustration the image elements 95 are 1 and the image elements 96 are 0. This image 75 can be regarded as being a summation of weighted basis images 76, 77, 78, 79, wherein in this example the weights are 1 and 0, because also the image elements 95, 96 are 1 and 0. If the image elements 95, 96 of the image 75 were not 1 and 0, the weights of the basis images 76, 77, 78, 79 were also not 1 and 0. The weights of the basis images 76, 77, 78, 79 are the respective measured values which have been received from the respective active region as defined by the corresponding basis image 76, 77, 78, 79. The measured values, which in this example are 1 and 0, can be arranged in a matrix in accordance with the different basis images 76, 77, 78, 79 as shown in the following:

$$\begin{pmatrix} 1 & 0 \\ 0 & 1 \end{pmatrix}.$$

The image 75 hence can be reconstructed by applying an inverse transformation to the previously shown matrix, wherein in this simple example, in which the basis images 76, 77, 78, 79 and hence the corresponding coding patterns only have a single active spatial region, which corresponds to a respective single pixel of the final image, the inverse transformation is simply an identity transformation. However, in other embodiments the basis images and hence coding patterns and therefore also the corresponding inverse transformation can be different.

Figure 5:
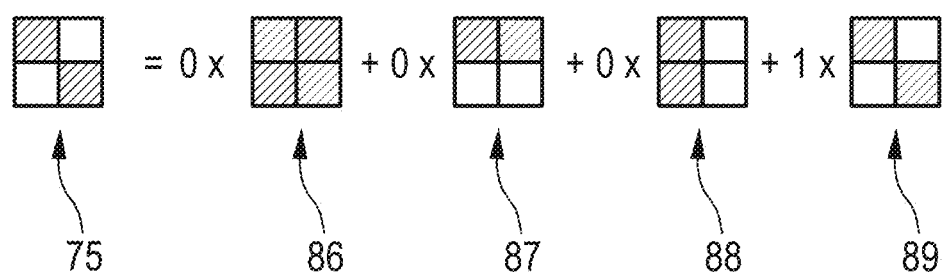
FIG. 5 illustrates schematically and exemplarily a decomposition of an image into Hadamard basis images.

In an embodiment the system controller 33 is configured to generate the different control signals such that the different coding patterns are in accordance with a Hadamard coding, wherein in this case a system controller 33 is configured to generate the image of the object by applying an inverse Hadamard transform to the received receive fields, i.e. to the received MR signals. This will be illustrated in the following with reference to FIG. 5.

In this example the basis images 86, 87, 88, 89 and hence the corresponding coding patterns are in accordance with the Hadamard coding, which results in following matrix:

$$\begin{pmatrix} 0 & 0 \\ 0 & 1 \end{pmatrix}.$$

Also in this example, if the image values were not 1 and 0, the weights of the basis images 86, 87, 88, 89 and hence the weights of the corresponding coding patterns and the elements of the resulting matrix would not be 1 and 0, but the corresponding other measured values. By applying an inverse Hadamard transformation to this matrix, the image 75 can be reconstructed, wherein the inverse Hadamard transform is simply the Hadamard transform due to the itself-inverse property.

This reconstruction of an image can be carried out, without necessarily requiring a switching of gradients, wherein this allows for noise reduction and increased scanning speed.

The signal transmitting device 32, 37 further can be configured to transmit a synchronization signal to the field modification device 1, wherein the signal receiver 21 of the field modification device 1 can be configured to receive the synchronization signal. Moreover, the control signal transmitting device 32, 37 can be configured to transmit the control signal to the field modification device 1, after the synchronization signal has been sent to the field modification device 1, and the signal receiver 21 of the field modification device 1 can be configured to receive the control signal from the MRI system 30, after the synchronization signal has been received. Also here the control signals can be transmitted by using transmit sequences (Tx sequences), i.e. the control signals can be included in the Tx sequences. However, the control signals can also be transmitted by using separate communication channels like WiFi or Bluetooth, as mentioned above.

Thus, for synchronizing the field modification device 1 with the MRI system 30, a trigger pulse can be transmitted to the field modification device 1 from the MRI system 30. The trigger pulse can be transmitted optically and/or electrically by using, for instance, the signal transmitting device 37. The trigger pulse "tells" the field modification device 1 that a control signal will follow, wherein in an embodiment this control signal can be included in a Tx sequence. In the latter case, the MRI system 30 then can use the Tx sequence for transmitting control information to the field modification device 1. The trigger pulse can be set at any time of a Tx sequence and not just before a respective Tx pulse such that this trigger mechanism allows to synchronize the field modification device 1 at any time.

The signal transmitting device 37 can comprise two sub devices, wherein a first sub device is configured for transmitting the control signal and a second sub device is configured for transmitting the trigger pulse, i.e. the synchronization signal. However, it is also possible that the signal transmitting device is a single transmitting device configured to subsequently transmit the synchronization signal and the control signal. It is also possible that the signal transmitting device 37 is just used for transmitting the synchronization signal, wherein the magnet field generating and receiving device 32 operates as transmitting device for transmitting the control signal, for instance, included in a transmission field Tx sequence. Thus, the Tx pulse or Tx sequence can be used to, for instance, change a chosen set of active individual resonator elements and their resonance frequency and/or resonance phases each time after such a trigger. In particular, the transmission field sequence can be used for changing the coding pattern each time after a trigger pulse has been received by the field modification device 1, as mentioned above.

The signal receiver 21 also can be a single device configured for receiving the synchronization signal and for receiving the control signal, but it can also be a device having at least two sub devices, wherein a first sub device is configured to receive the control signal and a second sub device is configured to receive the synchronization signal. For instance, the second device can comprise a detector for detecting optical and/or electrical synchronization signals which could also be regarded as being trigger pulses, wherein the first device can include, for instance, an antenna element for receiving the control signal electromagnetically, in particular, via a Tx sequence. The antenna element can be, for example, a conducting loop.

The system controller 33 can be configured to modify the control signal to be transmitted to the field modification device 1 depending on the received receive field. In particular, the system controller 33 can be configured to generate an image of the head of the patient 31 based on the received receive field and to modify the control signal to be transmitted to the field modification device depending on the generated image. For instance, the system controller 33 can be configured to determine a property value being indicative of a property to be optimized based on the generated image and to modify the control signal such that this property is optimized. In one embodiment this is done as described in the following with reference to a flowchart shown in FIG. 6.

In step 101 a control signal defining resonance frequencies and/or resonance phases of the resonator elements 2 of the field modification device 1 is generated and this control signal is transmitted to the field modification device 1. For instance, this control signal can define a coding pattern describing which resonator elements should be active and which resonator elements should be inactive. In step 102 the transmission field is transmitted to the head of the patient 31 for examining the head of the patient 31 by MR, thereby generating the receive field, and the receive field is received from the head of the patient 31, while the field modification device 1 is controlled in accordance with the transmitted control signal. Steps 101 and 102 are repeated, until an abort criterion is fulfilled in step 103. Thus, steps 101 and 102 are carried out in several loops until an abort criterion is fulfilled. Preferentially, in each loop another coding pattern is used such that for different coding patterns different receive fields are received. The abort criterion can be, for instance, that all coding patterns, which should be used for reconstructing an image, really have been used while carrying out steps 101 and 102 several times. Also another abort criterion could be used.

In step 104 a property value of the property to be optimized is determined based on the received receive fields. In particular, the system controller 33 reconstructs an image of the head of the patient 31 based on the received receive fields and the coding patterns of the different loops of carrying out steps 101 and 102 and determines the property value based on the reconstructed image. In this embodiment the property is the SNR of the generated image.

In step 105 the control signal is modified, wherein preferentially several control signals defining several coding patterns are modified, in order to increase the SNR of the imaging procedure. Thus, in step 105 preferentially a set of control signals defining a set of coding patterns is determined by modifying previously used control signals and hence previously used coding patterns. This modification should be carried out such that the SNR is increased.

In step 106 a respective modified control signal and hence a respective modified coding pattern is transmitted to the field modification device 1 and in step 107 the transmission field is transmitted to the head of the patient 31 for examining the head of the patient 31 by MR, thereby generating the receive field, and the receive field is received from the head of the patient 31, while the field modification device 1 is controlled in accordance with the respective transmitted control signal, i.e. uses the respective coding pattern. Steps 106 and 107 are carried out in several loops, until in step 108 it has been determined that all control signals and hence all coding patterns have been applied. In step 109 again a property value of the property to be optimized is determined based on the received receive fields, wherein in this step an image is reconstructed based on the receive fields and the coding patterns of steps 106 and 107 and wherein the SNR is determined based on this further reconstructed image of the head of the patient 31.

In step 110 it is determined whether the property determined in 109 has reached already an optimum, wherein in this case the optimization procedure ends in step 111. Otherwise the method continues with step 105, in order to further modify the control signals and hence the coding patterns such that the SNR is optimized. The optimization can use known optimization algorithms. For instance, an iterative and/or gradient optimization algorithm can be used. Starting from an initial guess for all degrees of freedom, i.e. for all resonance frequencies and resonance phases of all resonator elements, a multi-dimensional optimization can be performed to extremize, i.e. optimize, a target function like SNR in a defined region, by manipulating the degrees of freedom, i.e. by modifying the resonance frequencies and/or resonance phases of the resonator elements.

Thus, a feedback loop can be provided, wherein results of MRI scanning are used for optimizing the control of the field modification device 1. The reconstructed MR image or, in another embodiment, any other intermediate data obtained from the MRI scanner 30, can be used to feedback the optimization of a specific target function, wherein the target function can refer to maximizing or optimizing SNR in a defined region. Instead of the MR image other data derived from the received receive fields or even the received receive fields directly, i.e. raw data of a corresponding Rx coil, can be used for the optimization procedure. After a set of control signals and hence a set of coding patterns leading to an optimized SNR has been determined, this optimal set of control signals can also be used for generating images of other objects. Thus, it is possible to determine, for instance, during a calibration procedure, an optimized set of control signals and hence coding patterns, which are later used in an actual MRI procedure.

Referring again to FIG. 2, the field modification device 1 further comprises an energy harvesting element 24, 25 configured to harvest energy and to provide the harvested energy at least to the device controller 20. The field modification device 1 can also be configured to provide the harvested energy to the resonator elements 2 if required. The energy harvesting element 24, 25 comprises an energy reception element 25 configured to receive energy from an energy source and an energy storage 24 configured to store the received energy and to provide the stored energy. The energy storage 24 preferentially is a rechargeable battery or a supercapacitor. Moreover, in this embodiment the energy reception element is an antenna element. In particular, the energy harvesting element 24, 25 can comprise a battery 24 and an antenna 25 which is connected to the battery 24 via a rectifier. The antenna can be, for instance, an outer loop surrounding the resonator elements 2. In this regard it is noted that FIG. 2 really is only a schematical figure such that, for instance, the box 25 symbolizing the energy reception element in fact might not be box like, but an outer conducting loop like a wire loop or a trace loop on a PCB forming an antenna element as described above. A varying current can be induced in the antenna 25, rectified and then used to charge the battery 24.

Figure 7:
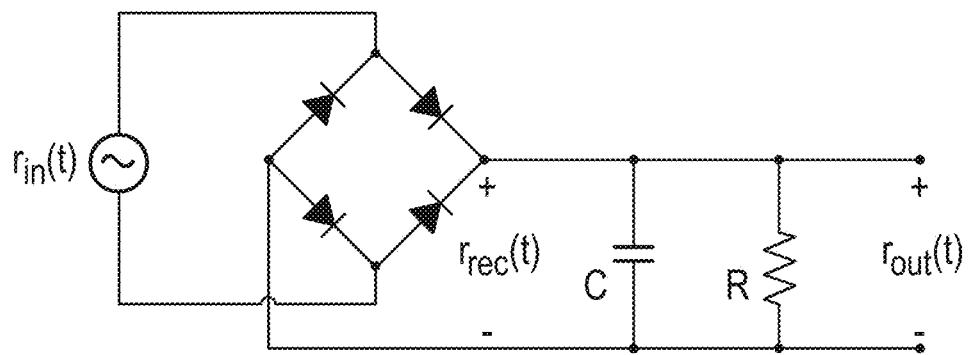
FIG. 7 schematically and exemplarily illustrates a rectifying circuit which can be used for rectifying received alternating energy which should be stored in a storage element.
Figure 8:
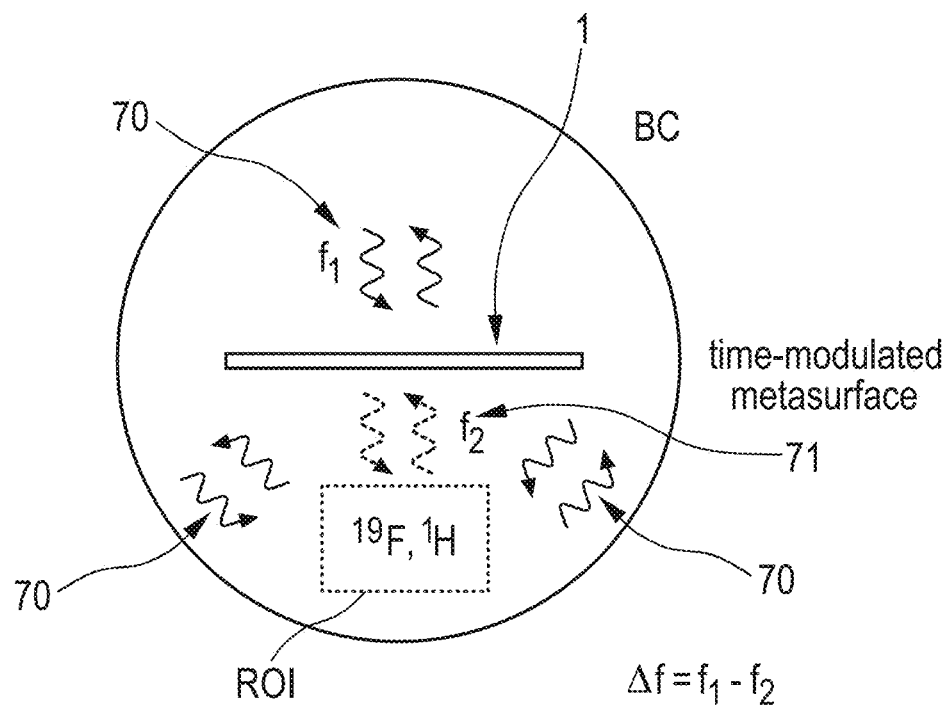
FIG. 8 illustrates schematically and exemplarily multi-nuclei MRI imaging, wherein the field modification device is controlled such that it modifies the frequency of an incoming field.
Figure 9:
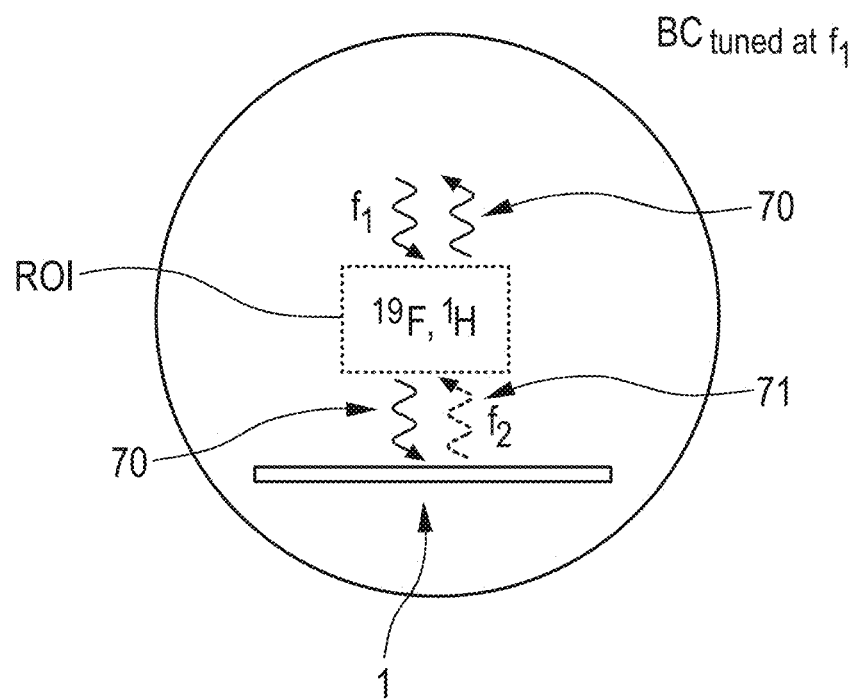
FIG. 9 illustrates schematically and exemplarily a further configuration in which a field modification device is used for modifying the frequency of the in-coming field, in order to allow for multi-nuclei imaging.

As explained above, the energy reception element 25 can be connected to the storage element 24 via a rectifier, wherein as a rectifier a circuit can be used like the circuit exemplarily and schematically illustrated in FIG. 7. In FIG. 7, the current on the left side indicates the received alternating current and the current on the right side indicates the rectified current. However, also another rectifying component could be used for rectifying the current induced in the antenna element.

The system controller 33 of the MRI system 30 is configured to control the magnetic field generating and receiving device 32 such that it generates a magnetic field which allows the energy harvesting element 24, 25 on the field modification device 1 to harvest energy. In particular, the system controller 33 is configured to provide a charging transmission sequence which allows the antenna 25 of the field modification device 1 to receive energy from the magnetic field generating and receiving device 32. Preferentially, a specific transmission charging sequence is used for energy harvesting, which is not used for generating an image of the object. This charging transmission sequence can be applied before an actual imaging procedure is carried out, in order to ensure that the energy storage 24 on the field modification device 1 has sufficient energy, before the actual imaging procedure starts. A transmission charging sequence can be determined by calibration, wherein different transmission sequences can be tried and wherein, after a respective transmission sequence has been carried out, it can be measured how much energy is stored in the energy storage 24. The transmission charging sequence is preferentially determined such that it differs from an imaging sequence used by the MRI system 30 with respect to the amount of power of the transmitted field and/or the duration of the sequence. Moreover, the transmission charging sequence preferentially does not comprise any gradient field.

The device controller 20 of the field modification device 1 also can be configured to individually control the respective resonance frequency and/or resonance phase of the respective resonator element 2 and/or of the respective group of resonator elements 2 such that the resonance frequency of the field modification device 1 differs from the frequency of the transmission field Tx, in order to not modify the transmission field Tx, in particular, in order to not enhance the Tx field. In another embodiment the field modification device can be configured to ensure that it does not modify the transmission field Tx in another way. For instance, the field modification device can comprise a non-linear power sensing element for ensuring that the transmission field is unaltered. In particular, the field modification device can be inductively coupled to one or more power-strength-sensing loops with non-linear elements like varactor diodes and/or passive limiter diodes, in order to provide a self-detuning of the field modification device while the transmission field Tx of the MRI system 30 is present. This can ensure that there is no or substantially no effect on a transmission Tx pulse during MR imaging. Thus, the field modification device 1 can be configured to be self-detuning in a transmit phase, i.e. in a Tx phase to protect the patient 31 and also electronics of the MRI system 30.

In this embodiment the detuning of the field modification device 1, while the transmission field Tx is applied, is carried out by the device controller. The field modification device 1 can detect, by using the energy reception element 25, which in this embodiment is an outer conducting loop, when the relatively powerful transmission field is applied, wherein then the device controller 20 controls the resonance frequencies and/or resonance phases of the resonator elements 2 such that the resonance frequency of the field modification device is far away from the frequency of the transmission field Tx. In particular, in this case the device controller controls the resonance of the field modification device 1 such that the resonance frequency is far away from this MRI system's Larmor frequency, in order to be surely detuned, i.e. "invisible" for the transmission field. Instead of or in addition to the conducting loop, the field modification device can also comprise another sensing circuit, which might be battery-powered and which is configured for detecting the transmission field, wherein, after the transmission field has been detected, the device controller 20 ensures that the field modification device does not resonate with the transmission field. In a further embodiment the MRI system informs the field modification device that the transmission field will follow, wherein based on this information the device controller of the field modification device can detune the field modification device such that it does not resonate with the following transmission field. For providing this information the MRI system can use the signal transmitting device 32, 37.

For detecting the transmission field, in order to detune the field modification device during transmission field application, an outer loop can be used which can also be used for receiving energy during energy harvesting as described above. Thus, a same outer loop can be used for detuning and for energy harvesting. In a further embodiment detuning can also be done manually. For instance, there can be a switch on the field modification device, which can be actuated by a user. The switch can be connected to the device controller, wherein, if the switch has been actuated, the device controller modifies the resonance of the field modification device such that it does not resonate with the transmission field.

The device controller 20 can also be configured to control the respective resonance frequency and/or resonance phase of the respective resonator element 2 and/or of the respective group of resonator elements 2 individually such that a transmission frequency of the transmission field and/or a receive frequency of the receive field are modified. Moreover, the field modification device 1 can comprise a power source 22 to actively drive the resonator elements 2.

Modifying the transmission frequency of the transmission field Tx and/or the receive frequency of the receive field Rx allows for multi-nuclei imaging in MRI with existing hardware of the MRI system 30 by frequency down- and up-conversion in transmission and/or receiving. In particular, multi-nuclei imaging is possible, even if the MRI system 30 is a 1H-resonance MRI system. In the following this will be illustrated with reference to FIGS. 6 and 7.

Figure 6:
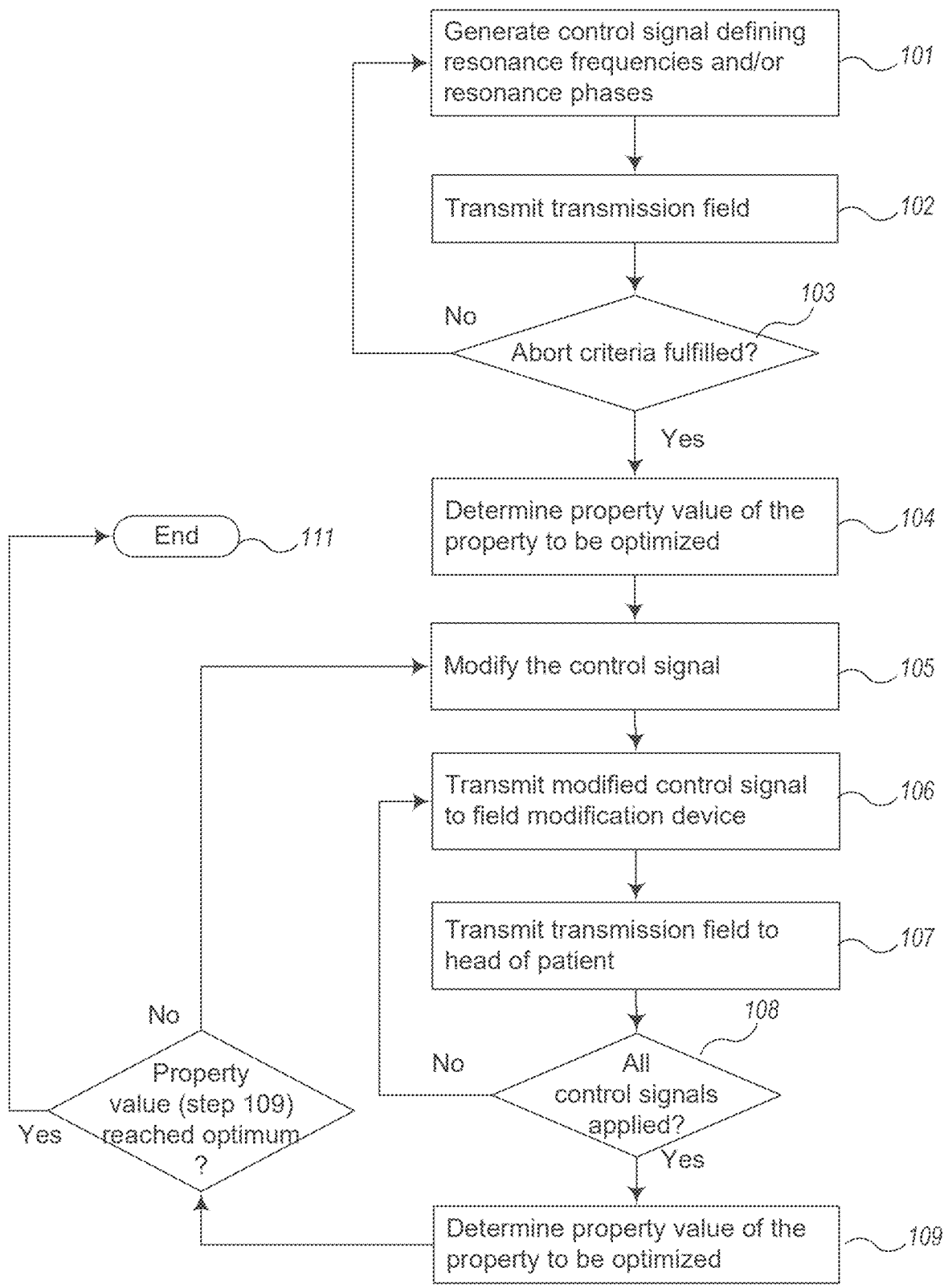
FIG. 6 shows a flowchart exemplarily illustrating an embodiment of a method for finding optimized coding patterns.

For clarity reasons, FIGS. 6 and 7 just shows a body coil BC of the magnetic field generating and receiving device 32, the field modification device 1 and a ROI including 19F, 1H. Generally, in MRI differed nuclei are related to different resonance frequencies for which the MRI hardware has to be optimized. In this embodiment the MRI system 30 is optimized for 1H imaging. The field modification device 1 can be controlled such that it provides a frequency down-conversion during transmission to locally excite the ROI at a shifted frequency being, in this example, the 19F resonance frequency. The MRI system 30 is configured to operate with the frequency f1, wherein the down-converted frequency is denoted by f2 in FIGS. 6 and 7. Imaging 1H is no problem with the MRI system 30, because the MRI system 30 is configured to image 1H. Moreover, since the field modification device 1 can be operated such that it provides a frequency conversion, the MRI system 30 can also be used for imaging 19F. Thus, the transmission frequency of the transmission field Tx of the 1H MRI system 30 can be shifted to a transmission frequency f2 for exciting 19F by using the field modification device 1, wherein the receive frequency f2 of the resulting receive field can be shifted back, i.e. upconverted, to the 1H frequency f1, in order to allow the magnetic field generating and receiving device 32 to detect the receive field coming from 19F.

In FIGS. 6 and 7 the non-converted fields are denoted by reference sign 70 and the frequency-converted fields are denoted by reference sign 71. The different nuclei can be imaged temporally subsequently, wherein the temporal distance between imaging two different nuclei can be, in an embodiment, so small that a quasi-simultaneous multi-nuclei imaging can be provided. If a temporal separation between two imaging scans of a same region, in particular of a same layer, is smaller than any physiological time scale, the two imaging scans are effectively simultaneous.

In this embodiment, the frequency shifting can be achieved similarly to the one employed in a heterodyne RF system, namely by means of a mixer. A mixer has two inputs and one output, wherein in this embodiment the input is the impinging field, i.e. the field to be modified, which might have a frequency f1 and which is the transmission field or receive field, while the second input at a frequency f2 is a periodic control signal applied to modulate the behavior of the controllable element of the respective resonator element with this frequency f2. The controllable element can be, for instance, a digital capacitor. If the controllable element is controlled in this way such that, for instance, its capacitance and/or its inductivity and/or its resistance is varied with the frequency f2, the two frequencies f1 and f2 are mixed by the respective resonator element such that the output frequency is, for example, f1-f2.

Figure 10:
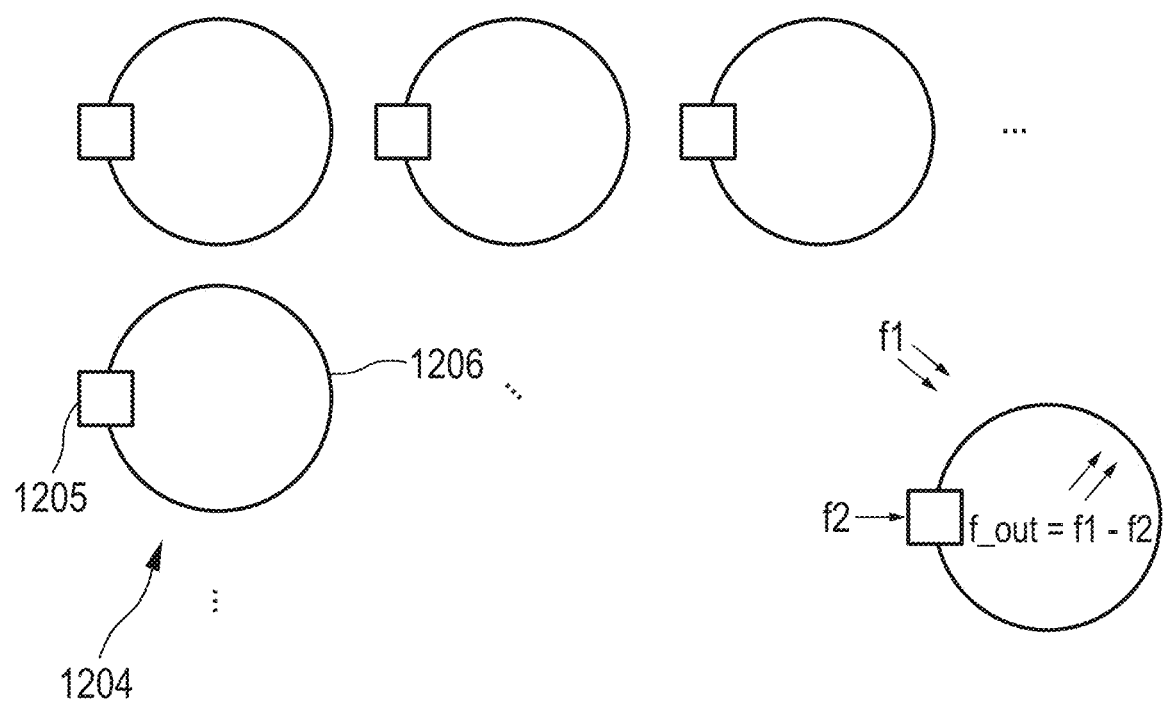
FIG. 10 illustrates schematically and exemplarily an embodiment of an arrangement of resonator elements of a field modification device, wherein a respective resonator element comprises a split ring resonator.
Figure 11:
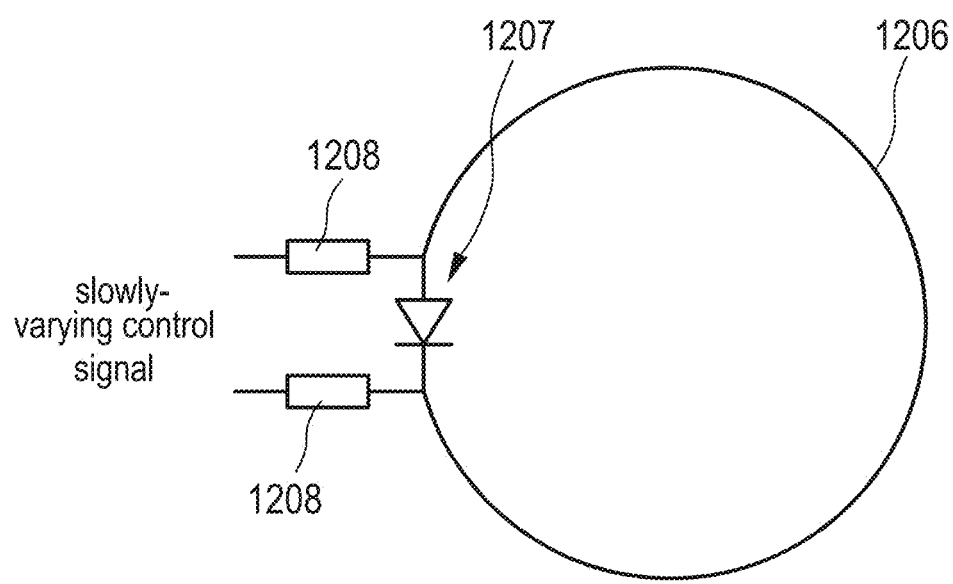
FIG. 11 illustrates schematically and exemplarily a resonator element of the arrangement of resonator elements shown in FIG. 10.

In an embodiment, which is schematically and exemplarily illustrated in FIG. 10, each resonator element 1204 comprises a respective split ring resonator 1206 or a respective spiral resonator loaded by a respective digital capacitor 1205, wherein the capacitance of the digital capacitor 1205 can be controlled such that it varies with the frequency f2. In an embodiment, each resonator element 1204 might also comprise an active device for amplifying the mixed output signal, wherein, for powering the amplifier, energy harvested on the field modification device might be used. Instead of the digital capacitor 1205, it is also possible to use a respective varactor diode 1207 that loads a respective split ring resonator 1206 or a respective spiral resonator, wherein the varactor diode 1207 is controlled by using a slowly-varying voltage signal resembling a saw-tooth signal and wherein an appropriate circuitry like RF chokes 1208 might be used to isolate the slowly-varying voltage signal from RF signals as illustrated in FIG. 11. The frequency of the slowly-varying voltage signal should be small in comparison to f1 and the output frequency of the mixer. Preferentially, the frequency f2 is 20 percent of the frequency f1, further preferred 10 percent of the frequency f1 or smaller and even further preferred 6 percent of the frequency f1 or smaller.

The control of the resonator elements 2 of the field modification device 1 such that the desired frequency conversion is achieved can be in accordance with predefined control information which defines, for instance, the resonance frequency and/or the resonance phase of individual resonator elements 2 or of groups of resonator elements 2 over time. This control information can be predefined by using optimization techniques. For example, the frequency of the modified field can be measured and the resonance frequencies and/or resonance phases of the resonator elements 2 can be modified, until the measured frequency is similar to the desired frequency. The frequency might be measured in a predefined region surrounding the field modification device 1. The optimization technique can optimize the converted frequency, wherein the optimized frequency might be the average of the measured frequency of the modified field in a predefined region. The optimization technique can be carried out in different steps, wherein in each step the resonance frequency and/or the resonance phase of one or several resonator elements 2 is modified and wherein after each step it is determined whether the desired frequency has been reached already or not. If the goal has been reached, the optimization process stops. Otherwise it continuous with the next modification step. For determining how to modify the resonance frequency and/or resonance phase, known techniques can be used like gradient descent based techniques. The optimization technique can also be configured to additionally optimize conversion efficiency, wherein the resonance frequencies and/or resonance phases of the resonator elements can be modified, until the measured frequency is similar to the desired frequency and until the conversion efficiency has reached a desired conversion efficiency value or has been optimized. In this case a corresponding target function can be a weighted combination of a) a deviation between the currently measured frequency and the desired frequency and b) a deviation between the current conversion efficiency and the desired conversion efficiency of just the conversion efficiency which should be optimized. In particular, the optimization technique tries to optimize the target function and thereby also the conversion frequency under the condition that the desired frequency will be reached. In one embodiment the conversion efficiency is defined as the ratio of the output signal power, i.e. the power at the desired frequency, and the input signal power, i.e. the power at the frequency f1.

The field modification device 1 can be configured to control the resonance frequencies and/or resonance phases of the resonator elements 2 or of the group of the resonator elements 2 such that at least some of the resonator elements 2 together resonate with their fundamental mode. However, the field modification device 1 can also be configured to control the resonance frequencies and/or resonance phases of the resonator elements 2 or of groups of resonator elements 2 such that at least some of the resonator elements 2 together resonate with a non-zero eigenmode, i.e. with a higher-order eigenmode. Thus, the field modification device 1 can be configured to be a zeroth-order resonator, but it can also be configured to be a higher-order resonator. Zeroth-order resonator means that the lowest eigenfrequency is used to be matched with the Larmor frequency of the MRI system 30. The full structure, i.e. the set of all active resonator elements 2, can be configured to resonate at the fundamental mode, i.e. at the lowest-order eigenmode or zeroth-order, or at any higher-order eigenmode by tuning the resonances and phases of the resonator elements 2 via the dynamic control.

Each resonator element 2 comprises a respective controllable element which has a modifiable capacitance and/or a modifiable inductivity and/or a modifiable resistance, in order to allow for the individual control by modifying the capacitance and/or the inductivity and/or the resistance of the respective controllable element, respectively. The respective controllable element is electrically connected to the device controller 20, in order to allow the device controller 20 to modify the resonance frequency and/or resonance phase of the respective resonator element 2. For instance, a respective resonator element 2 can comprise a diode, in particular a varactor diode, a PIN diode with node control and/or another diode, a capacitor, in particular a digitally tunable capacitor, a transistor, an inductance, a resistance, et cetera.

At least one of the components of the respective resonator element 2 is controllable, i.e. is a controllable element, such that the resonance phase and/or resonance frequency of the respective resonator element 2 can be modified by the device controller 20. For instance, each resonator element 2 of the matrix arrangement of the resonator elements 2 can comprise a digital capacitor as the respective controllable element, wherein the digital capacitor is interfaced by the device controller 20, which might be a microcontroller, of the field modification device 1, wherein the resonator elements 2 and the device controller 20 are arranged on the same support element 23 being, for instance, a PCB. By controlling each digital capacitor individually, the resonance frequency and/or resonance phase of individual resonator elements 2 or of groups of resonator elements 2 can be changed. How the resonance frequency and/or resonance phase of the resonator elements 2 or of groups of resonator elements 2 should be changed can be defined by control information received by the device controller 20 via, for instance, Bluetooth or via another data connection as described above. In an embodiment, a notebook or another computer can be used for sending the control information, i.e. corresponding control signals, to the field modification device 1.

Neighboring resonator elements 2 can be electrically connected to each other, wherein in an embodiment a respective switching element can be arranged between neighboring resonator elements. However, it is also possible that neighboring resonator elements are not electrically connected to each other.

FIG. 2 is a very schematic illustration of the field modification device 1. In the following more detailed components of field modification devices will be described.

Figure 12:
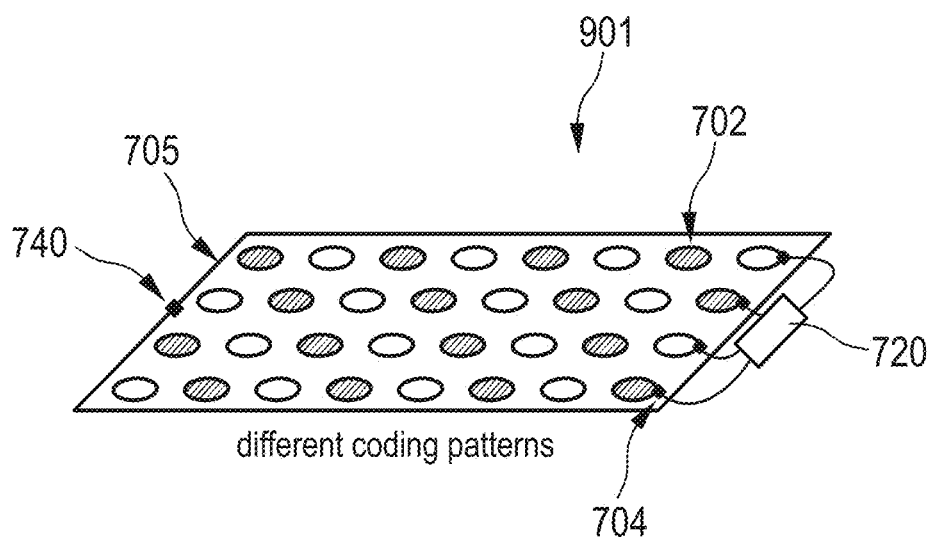
FIG. 12 shows schematically and exemplarily components of an embodiment of a field modification device, wherein it is indicated which resonator elements are active and which resonator elements are inactive.

FIG. 12 illustrates schematically and exemplarily still in a relatively generic way a coding pattern of a field modification device 901, wherein in this example the hatched resonator elements 702 are active and the non-hatched resonator elements 702 are inactive. Each resonator element 702 comprises a respective control element 704 which allows to modify the resonance frequency and/or resonance phase of the respective resonator element 702, wherein the control element might have a modifiable capacitance, inductivity and/or resistance. Each control element 704 is connected to the device controller 720, which might be a micro controller, for allowing the device controller 720 to individually control the resonance frequency and/or resonance phase of the respective resonator elements 702. In this illustration shown in FIG. 12 the resonator elements 702 are surrounded by an outer loop 705 which is connected to the device controller 720.

The outer loop 705 can be used for different purposes. For instance, it can be used as an antenna to receive control signals and/or synchronization signals from, for example, the MRI system 30. In addition or alternatively, the outer loop 705 can be used as an antenna for energy harvesting. Moreover, in addition or as an alternative, the outer loop 705 can be coupled to the inner arrangement of resonator elements and it can also include a controllable element like a digital capacitor or another controllable electrical component and/or a power-sensing non-linear component for automatic detuning if the incident field has a too large power.

The coupling between the outer loop 705 and the inner arrangement of resonator elements can be an inductive coupling and/or a capacitive coupling and/or a direct electrical coupling like a wired coupling or a coupling via a conductive trace on a PCB.

Also outer loops of other embodiments can have the functions explained above with reference to FIG. 12. Moreover, it is possible that such a loop 705 only encloses a sub-group of resonator elements. Moreover, in addition to a single outer loop, several outer loops can be used.

Depending on the function of the outer loop 705, the element 740 illustrated in FIG. 12 can be removed. Moreover, the element 740 can be a non-linear power sensing element like a varactor diode or a limiting diodes to control Tx detuning. It can also represent an energy storage like a rechargeable battery or supercapacitor. The element 740 also can be a combined element comprising the non-linear power sensing element and the energy storage.

The element 740 also can be a controllable element connected to the device controller 720, i.e. it can be a controllable element which can be controlled by the device controller 720. This allow the device controller 720 to control the resonance of the outer loop and hence also of the entire field modification device, i.e. of the outer loop and the inner arrangement of resonator elements, by controlling the controllable element 740. In particular, the controllable element 740 can be used to control the resonance frequency and/or resonance phase of the outer loop 705. As mentioned above, such a controllable element 740 can be, for instance, in a controllable capacitor, a controllable resistor and/or a controllable inductance.

Figure 13:
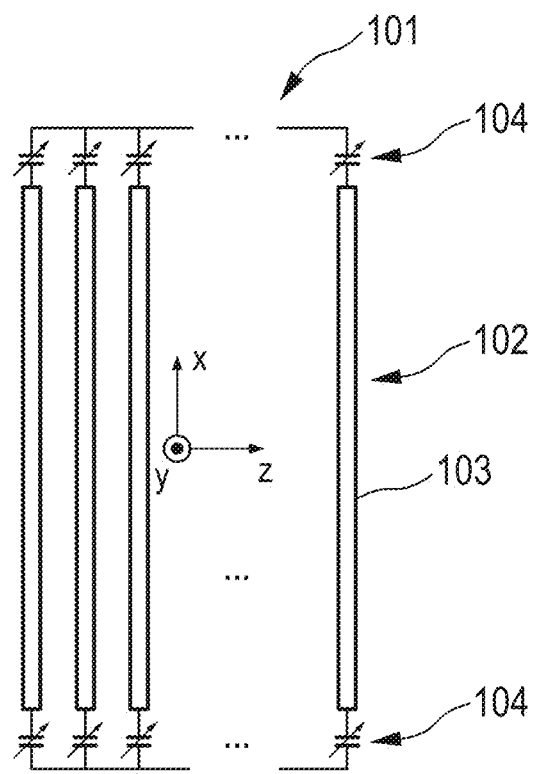
FIG. 13 shows schematically and exemplarily details of an embodiment of the field modification device.

As illustrated in FIG. 13, in an embodiment a field modification device 101 comprises several resonator elements 102 each having an elongated shape. Moreover, the resonator elements 2 having an elongated shape are parallel to each other. In this embodiment each resonator element 102 comprises a respective elongated conducting element 103 like a wire or an elongated conducting trace on a PCB which is connected in series to a respective controllable element 104. Moreover, in this embodiment all resonator elements 102 are electrically connected to each other at their ends as schematically and exemplarily illustrated in FIG. 13. However, in another embodiment it is possible that the resonator elements 102 are not electrically connected to each other. Thus, it is not necessary that the resonator elements 102 are electrically connected to each other at their ends. The controllable capacitors 104 are controllable by the device controller 20 via a wired or wireless connection.

The field modification device 101 acts as a system of closely-coupled resonator elements 102. This system supports hybrid electromagnetic modes with a specific spatial H-field profile. When a specific field profile of a certain mode is of interest, the mode can be tuned to resonate at a desired target frequency by controlling the capacitor values of the capacitors 104. A spatial modulation of such capacitances can introduce field profile modifications which can in turn be exploited to achieve a certain goal like, for instance, an increased SNR as explained above. The mode profile is related to the relative strength of the currents in each elongated conducting element 103. The resonator elements 102 are parallel to each other and the resulting structure resembles a finite-length artificial transmission line, wherein the propagation direction is the direction that is perpendicular to the resonator elements 102 or elongated conducting elements 103 and that is within the two-dimensional arrangement formed by the resonator elements 102. In FIG. 13 this direction is indicated as being the z direction. The elongated conducting elements 103 act as inductors, wherein, by controlling the capacitances, dispersion characteristics of the artificial transmission line can be controlled, hence a standing waves resonance frequency for a given line length can be controlled. These standing waves give rise to the desired field profiles.

Figure 14:
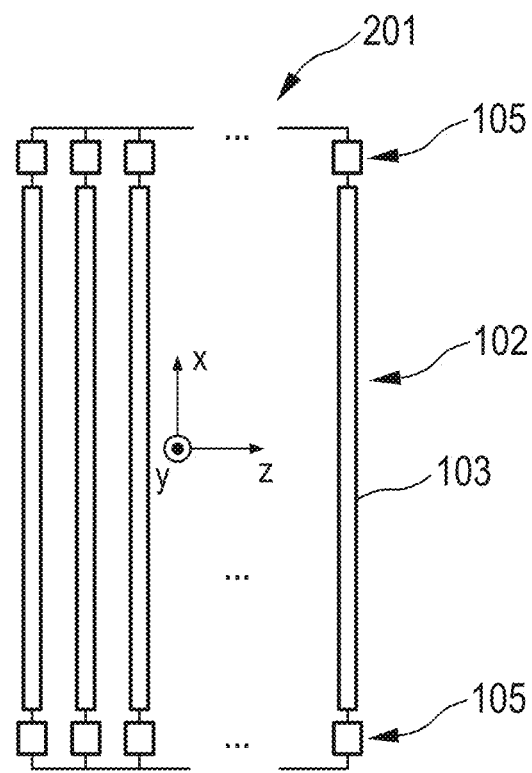
FIG. 14 also shows schematically and exemplarily details of an embodiment of the field modification device.
Figure 15:
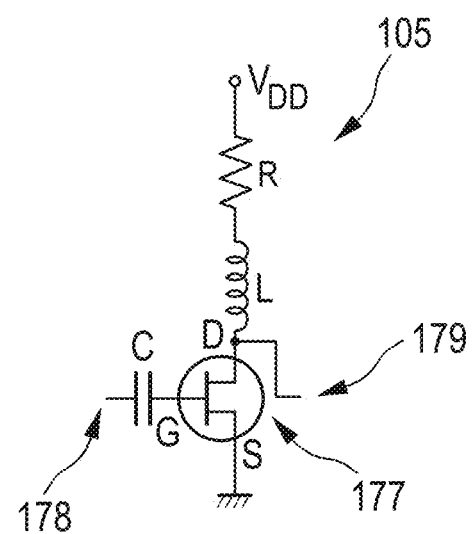
FIG. 15 shows schematically and exemplarily an embodiment of a control element of resonator element, which allows to modify the resonance phase and/or resonance frequency of the respective resonator element.

The variable capacitors 104 can be implemented in different ways, wherein for this reason in FIG. 14, which is similar to FIG. 13, the variable capacitors are represented as boxes 105, i.e. they are represented as bipolar circuit elements. Such a circuit element 105 is exemplarily illustrated in FIG. 15, i.e. FIG. 15 shows a circuit 105 forming a controllable capacitance, wherein the variable capacitance between gain and drain terminals G, D of a MOSFET 177 is controlled via voltage at the gate G. The variable capacitors can also be realized in another way. For instance, they can be realized as digital capacitors or MEMS.

In FIG. 15 VDD is a biasing voltage which allows to create a channel, whereas a control voltage from the device controller is applied to the gate terminal G and wherein the controlled capacitance in this case is picked up, i.e. read by the other parts of the resonator elements such as a split ring resonator, from the gate G to the drain D. In particular, the circuit shown in FIG. 15 might be connected to the further parts of the resonator elements at the positions indicated in FIG. 15 by reference signs 178, 179. Thus, FIG. 15 illustrates that a MOSFET can be used as a voltage-controlled capacitor instead of or in addition to another controllable element like a varactor diode. The circuit shown in FIG. 15 could also be used as a mixing device of a resonator element offering amplification.

Figure 16:
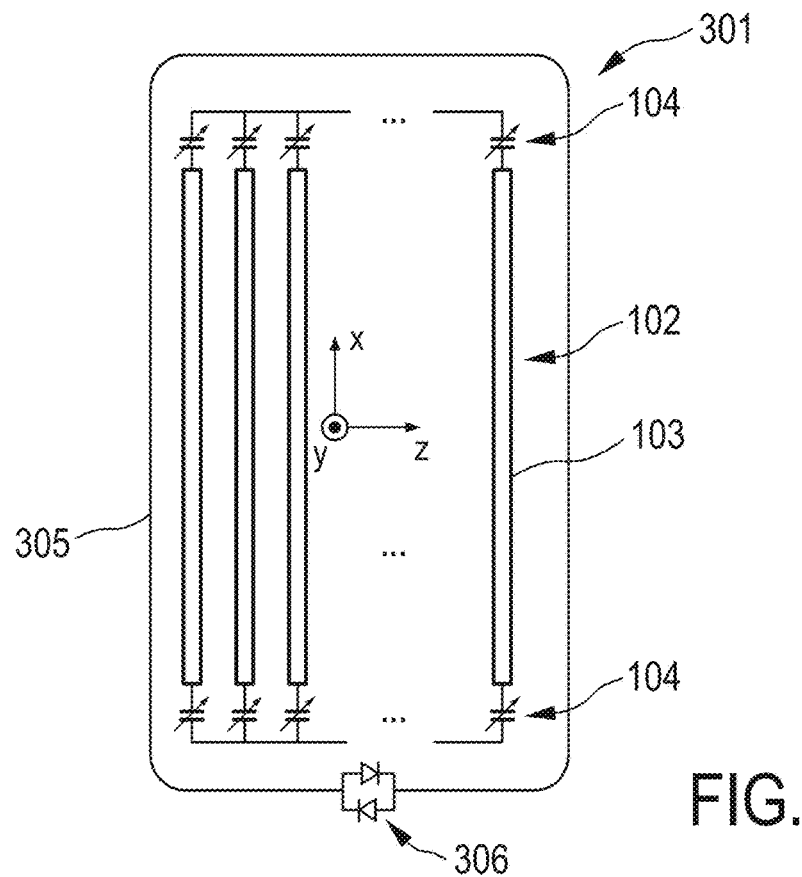
FIG. 16 shows schematically and exemplarily components of an embodiment of a field modification device, wherein an outer loop surrounds an inner arrangement of resonator elements.

The field modification device can comprise an outer conducting loop 305 as explained above and as schematically and exemplarily illustrated in FIG. 16. The resonator elements 102 shown in FIG. 16 are similar to the resonator elements 102 described above with reference to FIG. 13, wherein in this embodiment the resonator elements 102 are surrounded by the outer conducting loop 305. Also in other embodiments of the field modification device, a corresponding outer conducting loop 305 can be used. The outer conducting loop 305 might be utilized to receive energy to be harvested, receive control signals, receive synchronization signals, detect whether a transmission field is applied, et cetera. In this embodiment the ends of the loop 305 are connected via a pair of diodes 306 which are arranged such that they conduct in opposite directions. Thus, in this embodiment the field modification device 301 comprises elongated conducting elements 103 like wires or conducting traces on a PCB with series connected end capacitors 104 forming the resonator elements 102, wherein these resonator elements 102, particular the elongated conducting elements 103, are parallel to each other and are surrounded by the outer loop 305. In this embodiment the field modification device 301 therefore provides an artificial transmission line resonator coupled to an external loop 305 loaded by a limiting-diode pair 306. The outer loop 305 could also be used to sense an impinging power strength and hence detune the whole field modification device 305 should it be too high, as explained above. This allows for the above described self-detuning during, for instance, a transmission Tx cycle.

Preferentially, the outer loop 305 is connected to the device controller 20, in order to allow the device controller 20 to receive signals via the outer loop 305 working, in this case, as an antenna. The outer loop 305 might also be connected to the energy storage 24, in order to allow the energy storage 24 to store energy received by using the outer loop 305. The outer loop 305 therefore can also be used for energy harvesting. If the outer loop 305 should be used for energy harvesting, the pair of diodes 306 is preferentially replaced by an appropriate circuit, in particular by a rectifying circuit as explained above.

The conducting loop 305 can surround all resonator elements 102 as illustrated in FIG. 16 or it can only surround a sub group of the plurality of resonator elements 102. In particular, several conducting loops can be provided, wherein each conducting loop surrounds a respective sub group of the plurality of resonator elements. Preferentially, all resonator elements 102 are surrounded by a single conducting loop 305 or each sub group of resonator elements is surrounded by a respective conducting loop. As explained above, the conducting loop 305 can be used for one or several functions, wherein, for instance, the conducting loop 305 might act as antenna element of the signal receiver 21 of the field modification device.

The outer loops 305 and 705 can have similar functions. In particular, the functions described above for the loop 705 could also be provided by the loop 305 and vice versa. In particular, the loops 305 and 705 can be the same. Moreover, the element 740 described above with reference to FIG. 12 and the element 306 described above with reference to FIG. 14 can have similar functions and can be the same. In particular, instead of the element 306, in the embodiment described above with reference to FIG. 16 the element 740 described above with reference to FIG. 12 can be used and vice versa.

Figure 17:
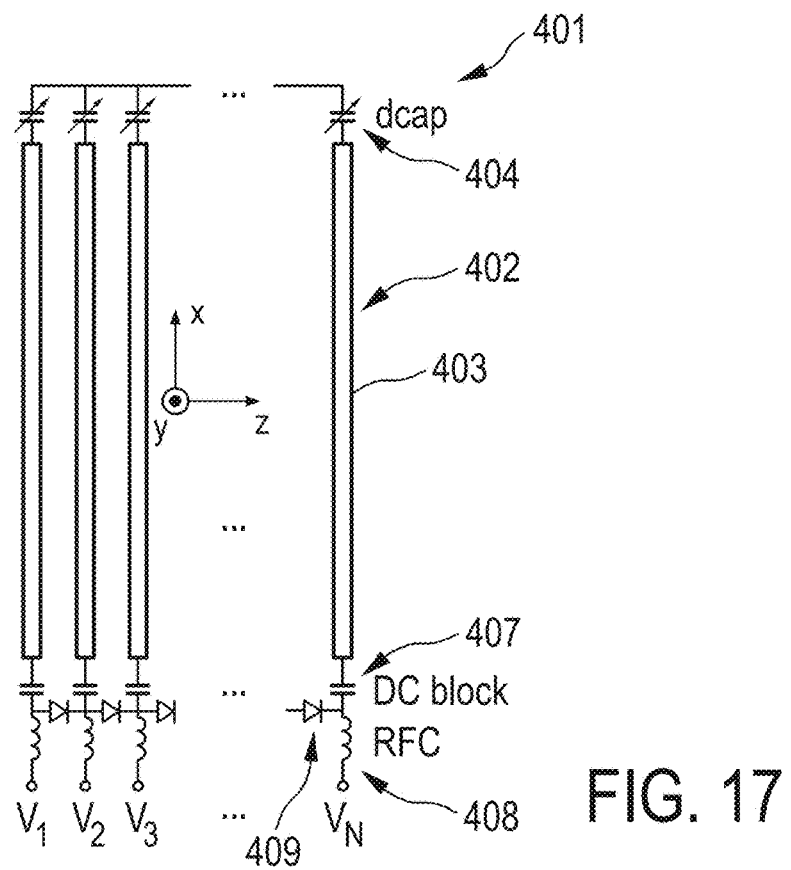
FIG. 17 shows schematically and exemplarily components of a further embodiment of a field modification device, wherein control voltages are applied to resonator elements, which are used for disconnecting resonator elements from other resonator elements.

FIG. 17 schematically and exemplarily illustrates a further embodiment 401 of the field modification device. In this embodiment each resonator element 402 is elongated and comprises a respective elongated conducting element 403 like a wire or a conducting trace on a PCB being electrically elongated by a series connected end capacitor 404, a DC block 407 and a coil 408. The capacitors 404 are variable and they can be implemented in different ways as also explained above with respect to FIG. 14. Moreover, also in this embodiment the controllable elements 404 of the resonator elements 402 are connected to the device controller 20, in order to allow to modify the resonance phases and/or resonance frequencies of the resonator elements 402. Moreover, also in this embodiment the resonator elements 402 comprising the capacitors 404, the DC blocks 407, the coils 408 and the elongated conducting elements 403 are parallel to each other. The resulting structure resembles also here a finite-length artificial transmission line, wherein the propagation direction is the direction that is perpendicular to the elongated conducting elements 403 and that is within the two-dimensional arrangement formed by the resonator elements 402, wherein this direction is defined as being the z direction. The elongated conducting elements 403 act as inductors, wherein by controlling the capacitors 404 dispersion characteristics of the artificial transmission line can be controlled, hence a standing wave resonance frequency for given line length can be controlled.

Neighboring resonator elements 402 are directly coupled via diodes 409 which preferentially are PIN diodes. Preferentially, the diodes 409 are connected to the respective resonator elements 402 between the respective coil 408 and the respective DC block 407. Furthermore, in this embodiment voltages V1 . . . VN are applied to respective ends of the respective coils 408 of the respective resonator elements 402, wherein these voltages are control voltages provided by the device controller 20. The control voltages V1 . . . VN together with the diodes 409 can be used as binary switches, in order to disconnect desired resonator elements, thereby allowing for an electronic control of the length of the artificial transmission line. Given that the field focus size is related to the length of the structure, the focus itself can be electronically controlled in this way. For providing the voltages V1 . . . VN the device controller 20 itself can comprise a voltage source or it can distribute the voltage provided by a separate voltage source accordingly.

Figure 18:
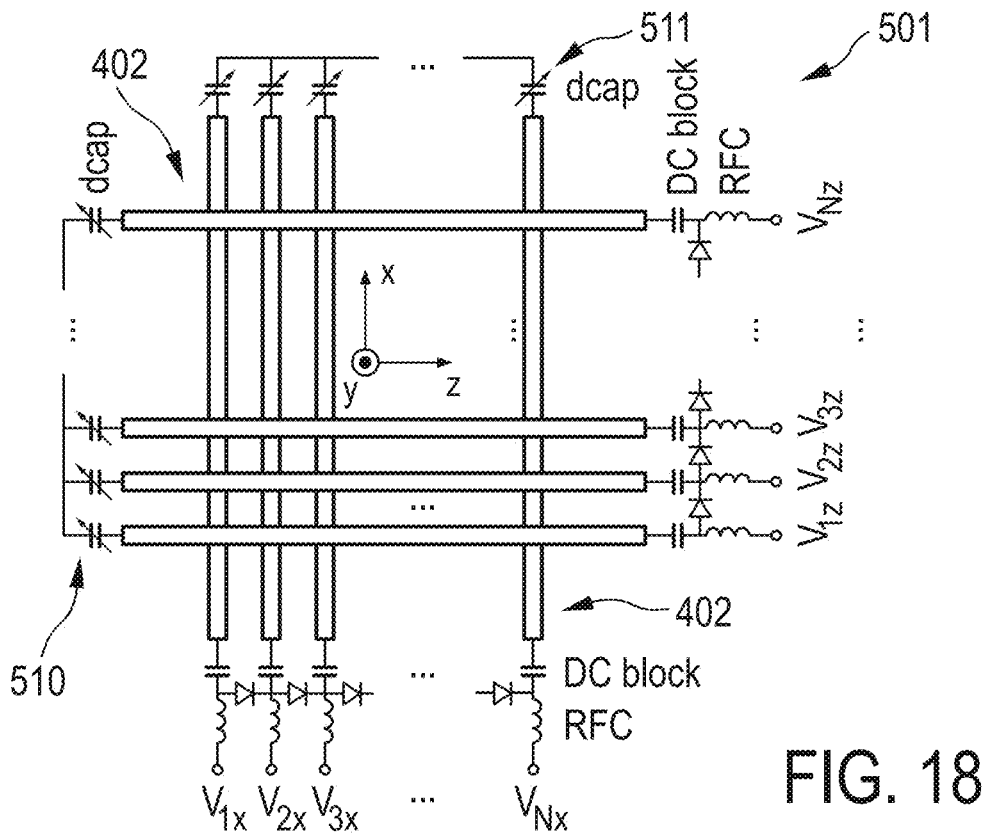
FIG. 18 shows schematically and exemplarily components of a further embodiment of a field modification device comprising a first set of parallel resonator elements and a second set of parallel resonator elements, where-in the two sets of resonator elements are rotated relatively to each other by 90 degrees.

The arrangement of resonator elements of the field modification device described above with respect to FIGS. 2, 9, 10, 12 and 13 are single two-dimensional arrangements. However, the plurality of resonator elements can also form several two-dimensional arrangements being parallel to each other as schematically and exemplarily shown in FIG. 18. Thus, in this embodiment 501 the plurality of resonator elements are arranged in two parallel planes and form two two-dimensional arrangements 510, 511 which are located on top of each other. The two parallel planes can be separated from each other such that an object to be examined can be placed in-between the two planes. In this embodiment the elongated resonator elements 402 of different two-dimensional arrangements 510, 511 are not parallel to each other, i.e. they are rotated relative to each other by 90 degrees in this embodiment. The angle between the artificial transmission lines of the different structures 510, 511 hence is also 90 degrees in this embodiment, which allows for the focus spot size to be controlled not only in a single direction like the z direction, but also in a perpendicular direction being, in this embodiment, the x direction.

Figure 19:
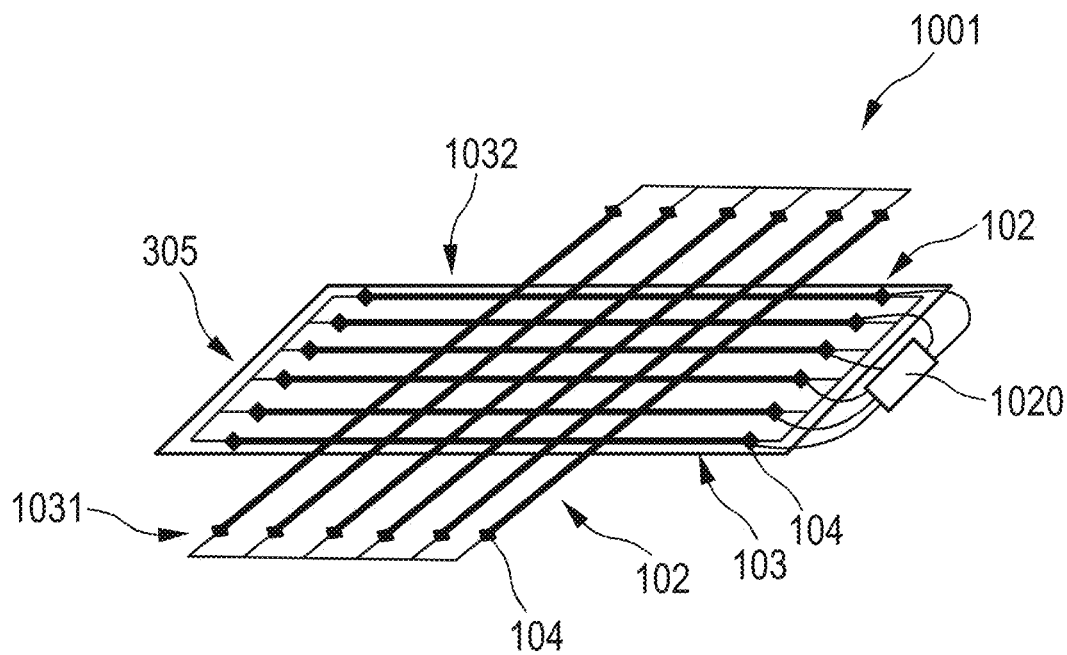
FIG. 19 also shows schematically and exemplarily components of an embodiment of field modification device, wherein first and second arrangements of resonator elements are rotated relative to each other by 90 degrees.

FIG. 19 shows schematically and exemplarily a further embodiment 1001 of a field modification device, wherein also in this embodiment 1001 two arrangements 1031, 1032 of resonator elements 102 with elongated conducting elements 103 are arranged on top of each other, wherein the resonator elements 102 of the first arrangement 1031 are rotated by 90 degrees relative to the resonator elements 102 of the other second arrangement 1032. Also in this embodiment each resonator element comprises a control element 104 like a capacitor of which the capacitance can be modified by the microcontroller 1020. Instead of the capacitors with modifiable capacitance, also other control elements 104 can be used for controlling the resonance phase and/or resonance frequency of the respective resonator element 102. FIG. 19 like the other figures does not show all connections and all components of the field modification device for clarity reasons. In this embodiment at least the arrangement 1032 of resonator elements 102 is surrounded by a conducting loop 305, when the conducting loop 305 is connected to the microcontroller 1020, i.e. the device controller 1020, in order to use the conducting loop 305 for, for instance, sensing a transmission field Tx wherein then the microcontroller 1020 can modify the control elements 104 such that the field modification device 1001 is detuned. As explained above, the conducting loop 305 can also be used for other purposes like energy harvesting, receiving control signals, receiving synchronization signals, et cetera.

Figure 20:
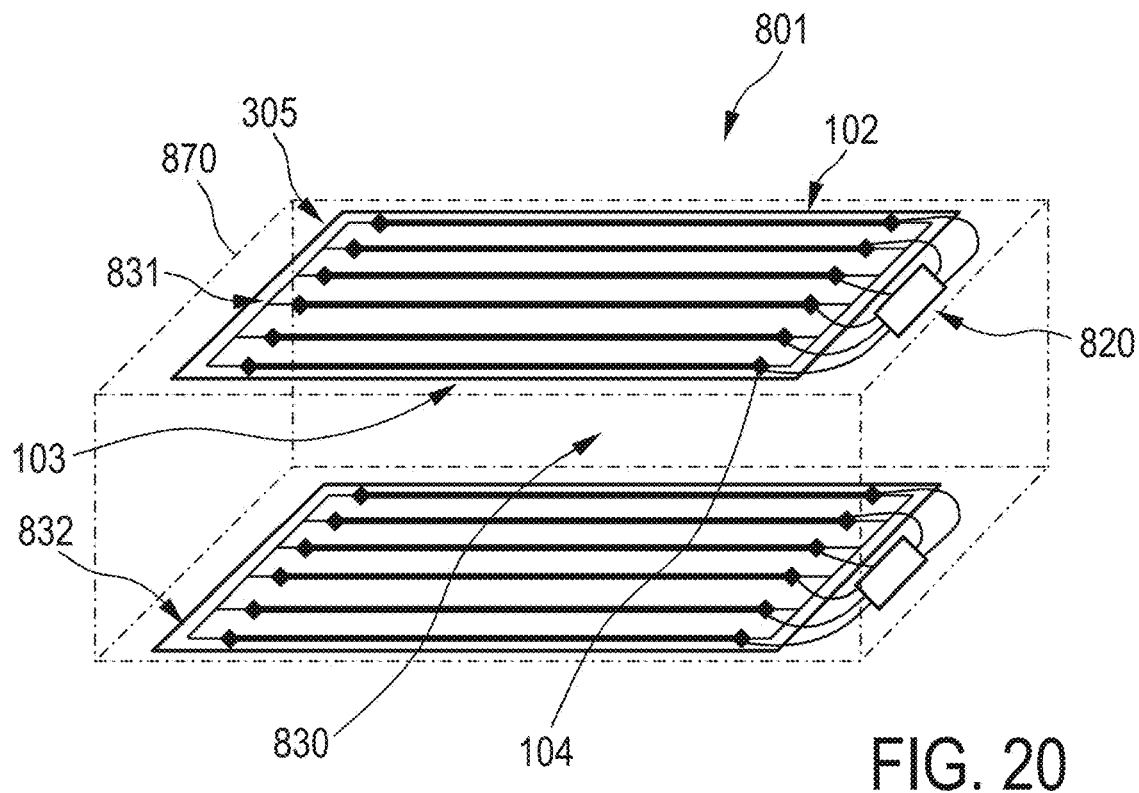
FIG. 20 shows schematically and exemplarily components of a field modification device comprising a box having side walls, wherein arrangements of resonator elements are located on opposing side walls of the box.

In a further embodiment the plurality of resonator elements are arranged such that they enclose a volume as schematically and exemplarily illustrated in FIG. 20. The field modification device 801 comprises a structure 870 enclosing the volume 830 and holding the resonator elements 102. In this embodiment the structure 870 is a casing with an opening for allowing an object or a part of the object to be arranged within the casing 870, wherein the resonator elements 102 are arranged on opposing walls of the casing. Each of the two arrangements 831, 832 of resonator elements 102 comprises elongated conducting elements 103 elongated with in series connected control elements 104 like modifiable capacitors, wherein the control elements 104 are connected to a device controller 820 for allowing the device controller 820 to modify the resonance phase and/or resonance frequency of the respective resonator element 102. Both arrangements 831, 832 of resonator elements 102 are surrounded by respective conducting loops 305.

Figure 21:
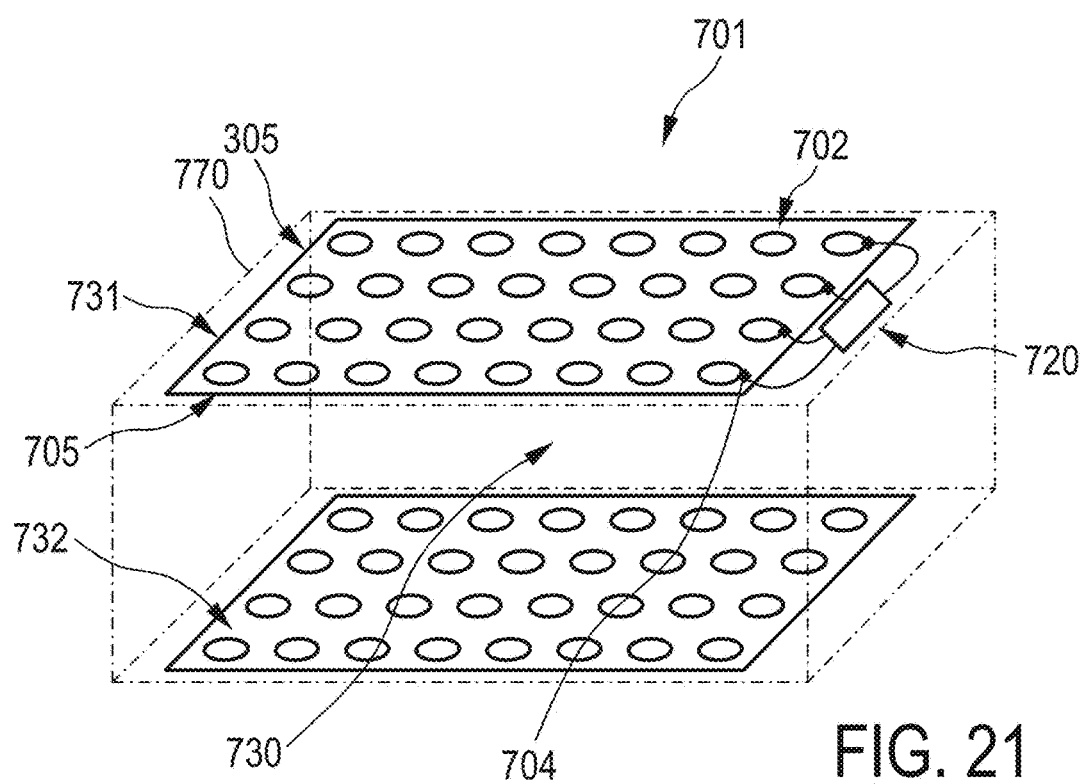
FIG. 21 shows schematically and exemplarily in a more generic way an embodiment of a field modification device with a box comprising side walls on which resonator elements are arranged.

FIG. 21 illustrates a field modification device 701 having a plurality of resonator elements 702 that are arranged such that they enclose a volume 730 in a more generic way. The resonator elements 702 are arranged matrix like and each resonator element 702 comprises a control element 704 like an electrical component with a modifiable electrical property, wherein in FIG. 21 for clarity reasons only some of the control elements 704 are shown. The control elements 704 can be, for instance, digital capacitors, varactors, et cetera. The resonator elements 702 are controlled by using the device controller 720, wherein the device controller 720 is connected to the control elements 704 of the resonator elements 702. Although the device controller 720 is connected to each of the resonator elements 702, only some of the connections are shown for clarity reasons.

The field modification device 701 comprises a structure 770 enclosing the volume 730 and holding the two arrangements 731, 732 of resonator elements 702. Also the structure 770 is a casing with an opening for allowing an object or a part of the object to the arranged within the casing, wherein the resonator elements 702 are arranged on a wall of the casing. The resonator elements 704 of the respective arrangements 731, 732 are surrounded by a respective outer conducting loop 305 which can have the functions as described above and which is connected to the device controller 720. The arrangements 731, 732 are similar, i.e. each arrangement comprises a respective device controller 720 and a respective conducting loop 305. In FIG. 21 for the configuration 732 less components are shown than for the other arrangement 731 just for clarity reasons.

Although in FIGS. 16 and 17 the resonator elements are regularly arranged on the walls of the respective casing which can also be regarded as being a box, in other embodiments the plurality of resonator elements can be arranged in another way. For instance, they can be arranged regularly in another way like spherically regularly or they can be arranged irregularly, wherein the arrangement or the arrangements preferentially still leave an opening to insert an object like a body region or another object to be scanned into the surrounded volume.

The enclosed volume 730, 830 preferentially includes an object to be imaged by MRI. With such an arrangement of the plurality of the resonator elements 102, 702 enclosing the volume 730, 830, a significant SNR enhancement in the volume 730, 830 can be obtained such that the SNR enhancement is almost homogeneous. Such an arrangement can be used, for instance, for imaging of the heart, the prostate, the head, joints and extremities. In another embodiment the enclosed volume of course can also be examined by using another MR technique like NMR.

A two-dimensional arrangement of resonator elements, which might be regarded as forming a two-dimensional metamaterial and hence, since being two-dimensional, a metasurface, can enhance the SNR in its vicinity, because the metasurface influences the surrounding only in its vicinity, i.e. it is a local effect. This effect drops off with the distance to the metasurface. However, if a field modification device comprises at least two two-dimensional arrangements 731, 732 or 831, 832 of resonator elements, which are parallel to each other, the drop off related to one of the two-dimensional arrangements is superimposed by the enhancement of the other. This can lead to a homogenous effect, or an almost homogenous effect, in the region in-between the two arrangements 731, 732 or 831, 832 of resonator elements.

Figure 22:
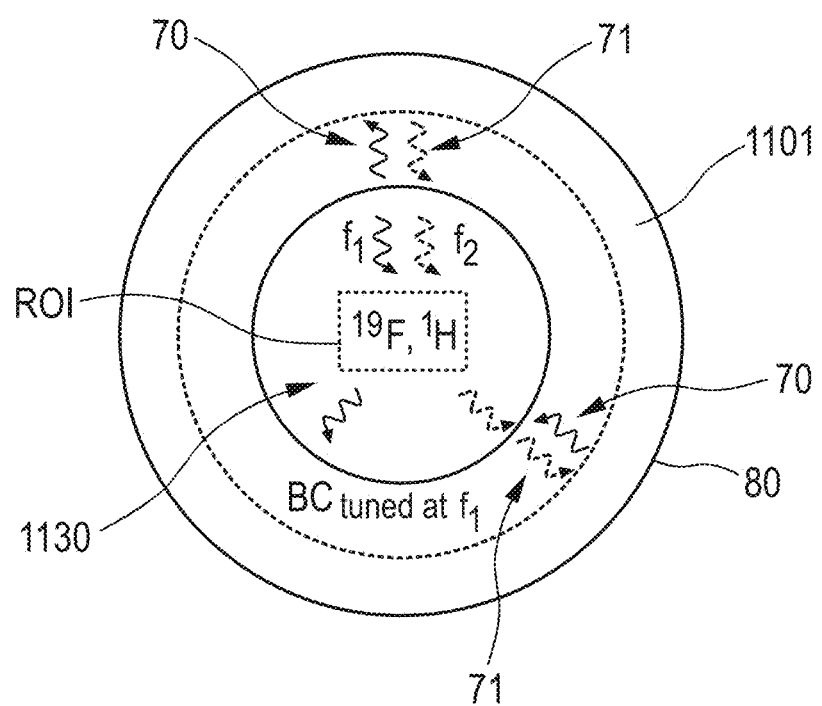
FIG. 22 illustrates schematically and exemplarily an embodiment of a cylindrical field modification device surrounding a body coil of an MRI system.

FIG. 22 illustrates schematically and exemplarily a further embodiment of a field modification device 1101 cylindrically surrounding a volume being, in this embodiment, an imaging region of the MRI system. In this embodiment the cylindrical field modification device 1101 surrounds a cylindrical body coil BC, wherein within the cylindrical body coil the imaging region or volume 1130 is located. The cylindrical field modification 1101 is surrounded by an RF shield 80. In this embodiment the field modification device 1101 preferentially comprises an EBG structure forming the arrangement of resonator elements. Moreover, the field modification device 1101 is preferentially controlled such that it emulates a perfect magnetic conductor (PMC). By calibration, i.e. by modifying the control of the resonance phases and/or resonance frequencies of the resonator elements until the desired PMC properties are obtained, controls of the resonator elements, which lead to the desired properties, can be predefined, wherein then these predefined controls, i.e. corresponding control signals, can be used for emulating a PMC.

FIG. 22 illustrates a situation in which the field modification device 1101 is used for multi-nuclei imaging. Thus, the device controller of the field modification device 1101 controls the resonance frequencies and/or resonance phases of the resonator elements of the cylindrical field modification device 1101 such that, if 19F should be imaged, the frequency is converted accordingly as described above, wherein in FIG. 22 f1 indicates the original frequency of the MRI system and f2 indicates the converted frequency. In this embodiment schematically and exemplarily illustrated in FIG. 22 the field modification device is preferentially realized by using an EBG structure. However, the field modification device 1101 can also be realized in another way, for instance, as described above with reference to the other embodiments.

Figure 23:
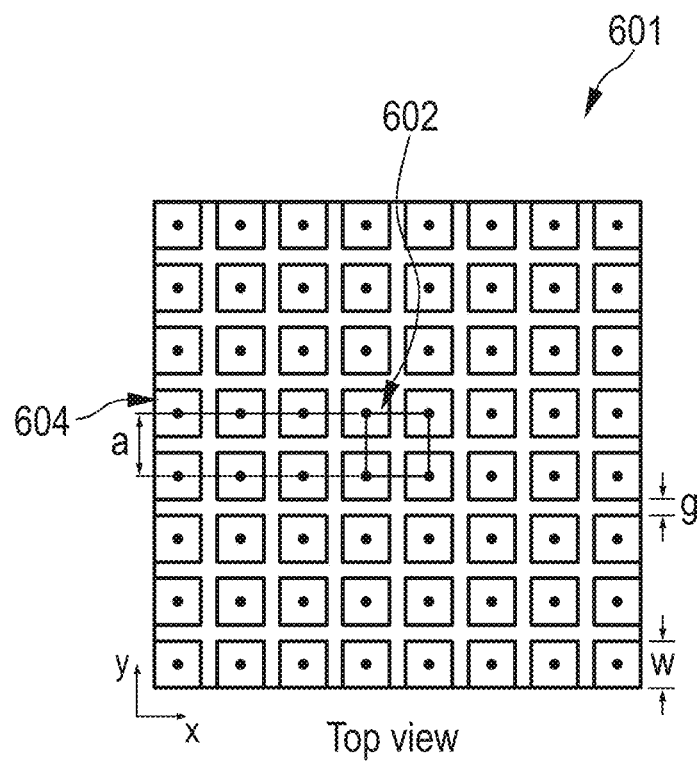
FIG. 23 shows schematically and exemplarily a top view of an EBG structure of a further embodiment of a field modification device.
Figure 24:
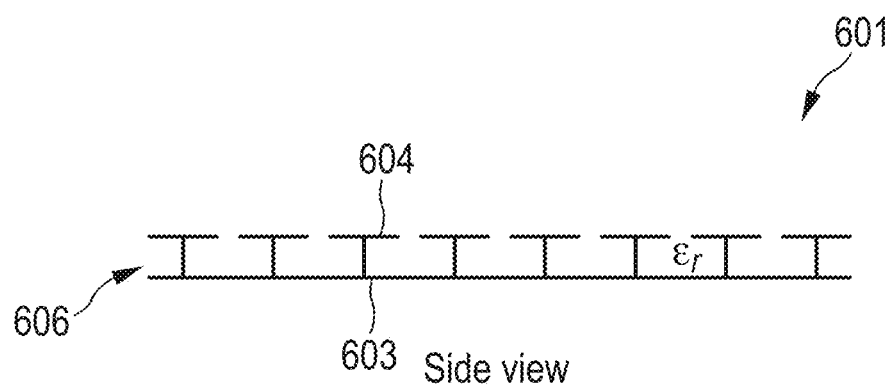
FIG. 24 shows schematically and exemplarily a side view of the EBG structure shown in FIG. 23.

FIG. 23 shows schematically and exemplarily an embodiment of a field modification device comprising an EBG structure forming the arrangement of resonator elements 602. In this embodiment, the resonator elements 602 are arranged matrix like, wherein FIG. 23 shows schematically a top view and FIG. 24 shows schematically a side view of the field modification device 601.

The EBG structure 601 comprises patches 604 on a substrate 603, wherein a respective resonator element 602 comprises a group of patches 604 electrically connected to each other by a controllable element 610. There is a gap g between neighboring patches 604, which have a width w. Moreover, a respective resonator element 602 has a side length a.

Figure 25:
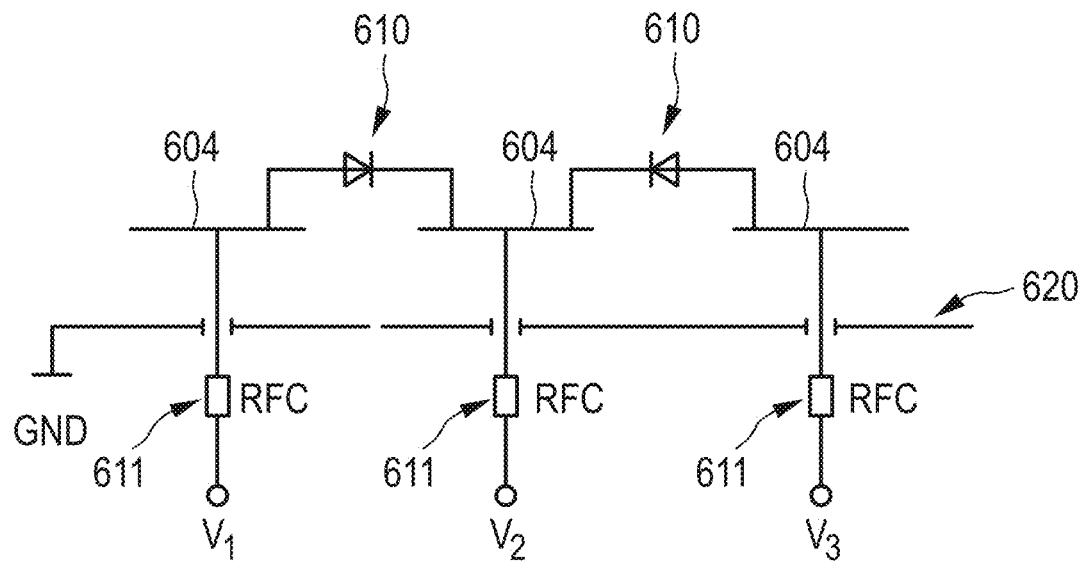
FIG. 25 illustrates schematically and exemplarily a circuit of resonator elements of an embodiment of a field modification device comprising an EBG structure.
Figure 26:
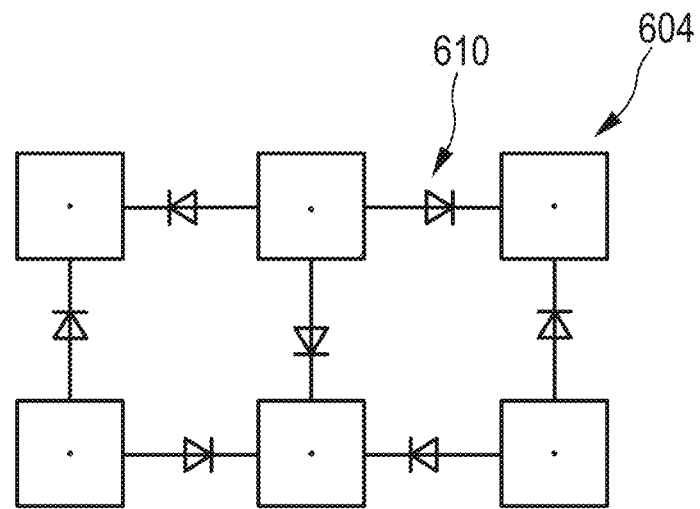
FIG. 26 illustrates schematically and exemplarily the circuit shown in FIG. 25 in a top view.

The controllable element 610 is schematically and exemplarily illustrated in FIGS. 25 and 26, wherein FIGS. 25 and 26 illustrate one circuit viewed from different directions. The controllable element 610 is a varactor diode in this example.

Neighboring patches 604 are electrically connected via a respective (varactor) diode 610, wherein respective control voltage V1, V2, V3, . . . can be applied to a respective patch 604 such that the respective varactor diode 610 is conducting or not conducting and wherein this allows to modify the resonance behavior of the respective resonator element 602. The shown circuit also comprises RF chokes 611, in order to isolate the control voltages V1, V2, V3, . . . from RF signals.

The control voltages can be provided to the patches through openings in a plane 620 being electrically grounded.

The different components of the field modification device can be arranged in different layers, wherein one layer might be formed by the grounded element or plane 620, a further layer with the patches and the varactor diodes can be on one side of the grounded plane and a further layer with the RF chokes and the control voltage supply can be on the other side of the grounded plane 620. The control voltages are preferentially slowly varying voltages. Preferentially, the frequency of the control voltages is at least five times smaller than the highest frequency employed in the system and hence of the incident field to be modified.

The resonator elements can comprise other and/or further electrical components like, for instance, a controllable capacitor electrically connected to the respective varactor diode in parallel or in series. In FIGS. 23 and 24 the electrical connections with the controllable element like the varactor diode 610 between the patches 604 are not shown for clarity reasons only.

Figure 27:
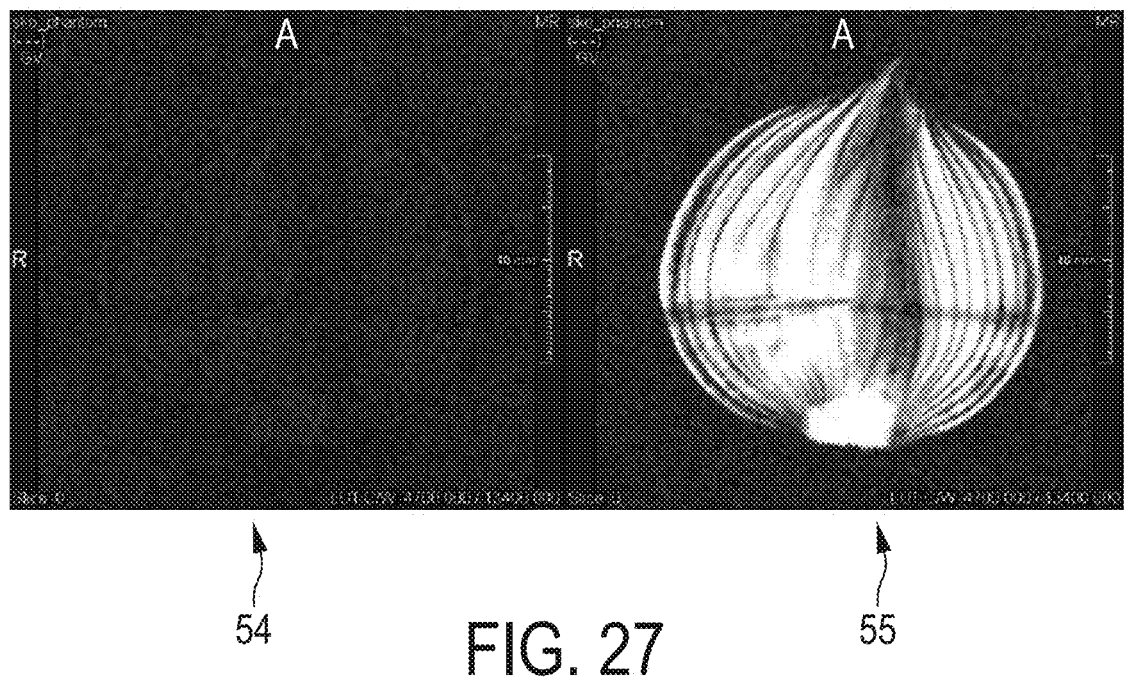
FIG. 27 shows schematically and exemplarily two slice images of an onion, wherein one slice image has been generated by MRI without a field modification device and a second slice image has been generated by MRI with a field modification device.

FIG. 27 schematically and exemplarily illustrates two images of an onion generated with the MRI system 30. A slice image 54 has been reconstructed without using a field modification device and a slice image 55 has been reconstructed by using the field modification device 801 illustrated in FIG. 20, wherein the slices are orthogonal to the arrangements 831, 832 of the resonator elements 102. In both cases, i.e. for generating the slice image 54 and for generating the slice image 55, a standard MRI imaging sequence was used, wherein in the latter case the field modification device 801 was configured to resonate with the receive field Rx frequency, thereby significantly increasing the SNR. Moreover, as can be seen in the image 55, the SNR is relatively homogenous.

Figure 28:
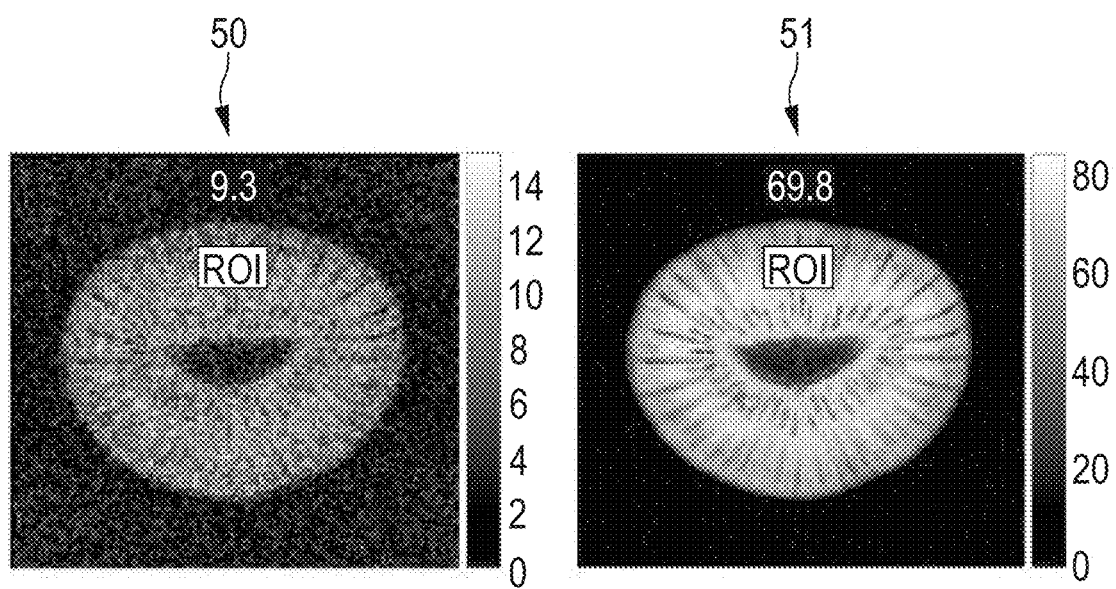
FIG. 28 shows schematically and exemplarily two slice images of a kiwi fruit, wherein a first slice image has been reconstructed by MRI without a field modification device and a second slice image has been recon-structed by MRI with a field modification device.

FIG. 28 shows two images 50, 51 of a kiwi fruit, wherein the image 50 is a slice image which has been generated by the MRI system 30 without using a field modification device and the slice image 51 has been generated by the MRI scanner 30 by using a field modification device. In this case, the field modification device comprises a single two-dimensional arrangement of resonator elements, wherein the imaged slice region is parallel to the two-dimensional arrangement of resonator elements. As can be seen again, the SNR is significantly increased, if the field modification device is used. Also in this case the field modification device is configured to resonate with the receive field Rx frequency.

The respective field modification device can be configured to individually control the resonance frequencies and/or resonance phases of the respective resonator elements and/or of the groups of resonator elements such that the transmission field and/or the receive field is modified, i.e. enhanced or reduced, locally, i.e. close to the respective arrangement of resonator elements. This can lead to an increased SNR close to the respective arrangement of resonator elements as also shown by image 51 of FIG. 28. The field modification device can increase the SNR by locally focusing an incident transmission field, an incident receive field or both, an incident transmission and an incident receive field. In particular, the field modification device can be configured and controlled such that the resonator elements are resonant at the frequency of this excitation, i.e. at the frequency of the incident excitation field, in order to pick up power from the incident excitation field, to resonate and thus emit electromagnetic radiation. The total power is not changed, but locally redistributed which leads to the increased SNR close to the respective arrangement of resonator elements.

The local enhancement of the incident field also leads to noise reduction because of being a local effect. That means that another mechanism of noise reduction is related to the smaller field of view obtained due to the intrinsic focusing ability of the field modification device. Hence, less sample noise is collected due to the limited spatial sensitivity profile of the field modification device.

Figure 29:
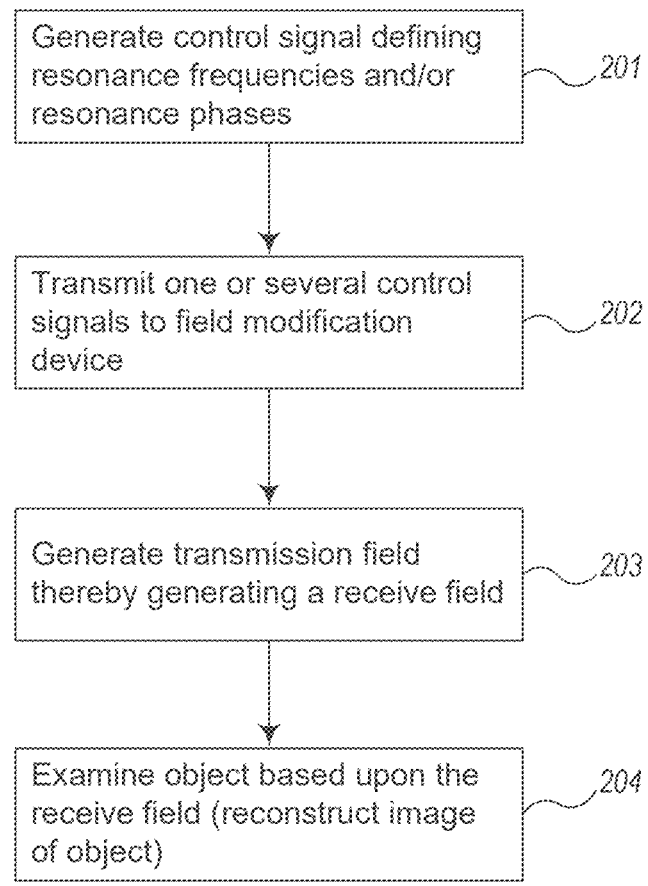
FIG. 29 shows a flowchart exemplarily illustrating an MR method for examining an object.

In the following an embodiment of an MR method for examining an object by MR will exemplarily be described with reference to a flow chart shown in FIG. 29.

In step 201 a control signal defining resonance frequencies and/or resonance phases of resonator elements of a field modification device for modifying a transmission field and/or a receive field of an MRI system is generated. In particular, one or several control signals are generated, which define the resonance frequencies and/or resonance phases of the resonator elements of the field modification device during an imaging procedure of the MRI system.

In step 202 the one or several control signals are transmitted to the field modification device. In step 203 at least a transmission field is generated by the MRI system, in order to examine the object by MR, thereby generating a receive field. Moreover, in step 203, the receive field is received from the object by the MRI system and during this process of transmitting the transmission field and receiving the receive field the field modification device uses the resonance frequencies and/or resonance phases for the resonator elements of the field modification device as defined by the one or several control signals transmitted from the MRI system to the field modification device in step 202.

In step 204 the object is examined based on the received receive field, i.e. based on the received MR signal. In particular, an image of the object is reconstructed based on the received receive field.

In step 203, at least a sub group of the resonator elements of the field modification device is induced to resonate by the transmission field and/or the receive field, thereby modifying the transmission field and/or the receive field, respectively, wherein a respective resonance frequency and/or resonance phase of a respective resonator element and/or of a respective group of resonator elements is individually controlled. These sub steps of step 203 could be regarded as being steps of a field modification method for modifying a transmission field and/or a receive field utilized by an MR system.

Although in above described embodiments the MR system is an MRI system, in other embodiment it can also be another MR system for examining an object by MR like an NMR spectroscopy system. In particular, the field modification device can control the resonance frequencies and/or resonance phases of the resonator elements such that the field modification device is in resonance with a receive field generated by an object to be examined by NMR, in order to increase the SNR of NMR spectroscopy. A corresponding field modification device can simply be placed above or below the object to be examined, in order to increase the SNR, or the object to be examined can simply be placed within a box-like field modification device, in order to increase SNR. The receive field, i.e. the generated NMR signal, can be recorded as usual by a conventional Rx coil of the NMR spectroscopy system.

Moreover, the frequency conversion, which can be carried out by the field modification device, can also be used for performing spectroscopy, because MR signals, in particular, NMR signals, can be obtained for different frequencies. Thus, for different frequencies MR signals of the object to be examined can be obtained and the resulting MR spectrum can be used for examining the object.

Although in above described embodiments the one or several arrangements of resonator elements are mostly planar, they can also be non-planar, in particular, curved. For instance, a two-dimensional arrangement can be a surface of sphere or of another curved object.

Other variations to the disclosed embodiments can be understood and effected by those skilled in the art in practicing the claimed disclosure, from a study of the drawings, the disclosure, and the appended claims.

In the claims, the word "comprising" does not exclude other elements or steps, and the indefinite article "a" or "an" does not exclude a plurality.

A single unit or device may fulfill the functions of several items recited in the claims. The mere fact that certain measures are recited in mutually different dependent claims does not indicate that a combination of these measures cannot be used to advantage.

Steps like the generation of a control signal, the generation of an image, the optimization of a desired property, et cetera performed by one or several units or devices can be performed by any other number of units or devices. These steps and/or the control of the MR system in accordance with the MR method and/or the control of the field modification device in accordance with the field modification method can be implemented as program code means of a computer program and/or as dedicated hardware.

A computer program may be stored/distributed on a suitable medium, such as an optical storage medium or a solid-state medium, supplied together with or as part of other hardware, but may also be distributed in other forms, such as via the Internet or other wired or wireless telecommunication systems.

All of the above U.S. patents, U.S. patent application publications, U.S. patent applications, foreign patents, foreign patent applications and non-patent publications referred to in this specification and/or listed in the Application Data Sheet, are incorporated herein by reference, in their entireties.

From the foregoing it will be appreciated that, although specific embodiments have been described herein for purposes of illustration, various modifications may be made without deviating from the spirit and scope of this disclosure. For example, the methods and systems discussed herein are applicable to other architectures. Also, the methods and systems discussed herein are applicable to differing protocols, communication media (optical, wireless, cable, etc.) and devices (such as wireless handsets, electronic organizers, personal digital assistants, portable email machines, game machines, pagers, navigation devices such as GPS receivers, etc.).

The invention claimed is:

1. A field modification device for modifying a transmission field (Tx) and/or a receive field (Rx) used by a magnetic resonance system, wherein the field modification device comprises:
   a plurality of resonator elements being inducible by the transmission field (Tx) and/or the receive field (Rx) to resonate, thereby modifying the transmission field (Tx) and/or the receive field (Rx), respectively, wherein a respective resonance frequency and/or resonance phase of a respective resonator element and/or of a respective group of resonator elements is individually controllable; and
   device controller configured to individually control the respective resonance frequency and/or resonance phase of the respective resonator element and/or of the respective group of resonator elements, wherein the resonator elements are dynamically controlled by manipulating their resonance frequency and/or resonance phase.

2. A magnetic resonance system for examining an object by magnetic resonance, the magnetic resonance system comprising:
   a magnetic field generating and receiving device configured to generate at least a transmission field (Tx) to be transmitted to the object for examining the object by magnetic resonance, thereby generating a receive field (Rx), and to receive the receive field (Rx) from the object;
   a system controller configured to generate a control signal defining resonance frequencies and/or resonance phases of a plurality of resonator elements of a field modification device for modifying the transmission field (Tx) and/or the receive field (Rx), wherein a respective resonance frequency and/or resonance phase of a respective resonator element and/or of a respective group of resonator elements is individually controllable, wherein the resonator elements are dynamically controlled by manipulating their resonance frequency and/or resonance phase; and
   a signal transmitting device configured to transmit the generated control signal to the field modification device.

3. The field modification device as defined by claim 1 wherein the field modification device comprises a signal receiver configured to receive a control signal that includes information how the respective resonance frequency and/or resonance phase should be modified and to provide the control signal and/or the information to the device controller, wherein optionally the signal receiver is further configured to receive a synchronization signal.

4. The field modification device as defined by claim 1 wherein the field modification device is configured to control the resonance frequencies and/or resonance phases of the resonator elements such that at least some of the resonator elements together are inducible to resonate at a frequency of the transmission field (Tx) and/or of the receive field (Rx).

5. The field modification device as defined by claim 1 wherein the field modification device is configured to control the resonance frequencies and/or resonance phases of the resonator elements such that at least some of the resonator elements together resonate with their fundamental mode or with a higher-order eigenmode.

6. The field modification device as defined by claim 1 wherein the field modification device is configured such that it does not modify the transmission field (Tx).

7. The field modification device as defined by claim 1 wherein the device controller and/or the received control signal is configured to control the respective resonance frequency and/or resonance phase of the respective resonator element (and/or group of resonator elements individually such that a transmission frequency of the transmission (Tx) field and/or a receive frequency of the receive field (Rx) are modified.

8. The field modification device as defined by claim 1 wherein the field modification device further comprises an energy harvesting element configured to harvest energy and to provide the harvested energy at least to the device controller.

9. The field modification device as defined by claim 1 wherein the field modification device comprises at least one conducting loop which surrounds at least a subgroup of the plurality of resonator elements.

10. The field modification device as defined by claim 1 wherein the respective resonator element has a circular, polygon or elongated shape.

11. The field modification device as defined by claim 1 wherein a respective resonator element comprises a respective elongated conducting element, which optionally is connected in series to a respective controllable element of a respective controllable element which has a modifiable capacitance and/or a modifiable inductivity and/or a modifiable resistance, in order to allow for an individual control by modifying the capacitance and/or inductivity and/or resistance of the controllable element.

12. The field modification device as defined by claim 1 wherein a respective switching element is electrically connected between neighboring resonator elements.

13. The field modification device as defined by claim 1 wherein the plurality of resonator elements form a single two-dimensional arrangement or several two-dimensional arrangements, wherein optionally a respective resonator element comprises a respective elongated conducting element and wherein optionally the elongated resonator elements of different two-dimensional arrangements are parallel or not parallel to each other.

14. The field modification device as defined by claim 1 wherein the plurality of resonator elements are arranged such that they enclose a volume.

15. The field modification device as defined by claim 1 wherein the field modification device comprises an electromagnetic band gap (EBG) structure forming the resonator elements.

16. The magnetic resonance system as defined in claim 2 wherein
   the system controller is configured to generate different control signals such that they are indicative of different coding patterns that define which resonator elements are active and which resonator elements are inactive, wherein a respective resonator element is active if it resonates with the frequency of the transmission field (Tx) and/or with the frequency of the receive field (Rx) and a respective resonator element is inactive if it does not resonate with the frequency of the transmission field (Tx) and/or the frequency of the receive field (Rx);
   the control signal transmitting device is configured to transmit the different control signals to the field modification device in order to allow the field modification device to temporally subsequently apply the different coding patterns indicated by the different control signals while the magnetic field generating and receiving device generates at least the transmission field (Tx) to be transmitted to the object for examining the object by magnetic resonance, thereby generating the receive field (Rx), and receives the receive field (Rx) from the object, such that, while a respective coding pattern has been applied, a respective receive field (Rx) has been received; and
   the system controller is configured to generate an image (of the object based on the respective received receive fields (Rx) and the respective coding patterns.

17. The magnetic resonance system as defined by claim 2 wherein the system controller is configured to modify the control signal depending on the received receive field (Rx).

18. The magnetic resonance system as defined by claim 2 wherein the system controller is configured to determine a property value being indicative of a property to be optimized based on the received receive field (Rx) and to modify the control signal such that the property is optimized.

19. A non-transitory computer readable storage medium containing instructions for controlling a magnetic resonance system for examining an object by magnetic resonance as defined by claim 2 when executed on a controller of the magnetic resonance system to cause the magnetic resonance system to perform a method comprising:

generating at least a transmission field to be transmitted to the object for examining the object by magnetic resonance, thereby generating a receive field, and receiving the receive field from the object;

generating a control signal defining resonance frequencies and/or resonance phases of the resonator elements of a field modification device for modifying the transmission field and/or the receive field, wherein a respective resonance frequency and/or resonance phase of a respective resonator element and/or of a respective group of resonator elements is individually controllable, wherein the resonator elements are dynamically controlled by manipulating their resonance frequency and/or resonance phase in accordance with claim 1; and transmitting the generated control signal to the field modification device.

\* \* \* \* \*